United States Patent [19]
Atkins

[11] Patent Number: 5,911,135
[45] Date of Patent: Jun. 8, 1999

[54] SYSTEM FOR MANAGING FINANCIAL ACCOUNTS BY A PRIORITY ALLOCATION OF FUNDS AMONG ACCOUNTS

[75] Inventor: Charles Agee Atkins, Amelia Island, Fla.

[73] Assignee: Proprietary Financial Products, Inc., Charleston, S.C.

[ * ] Notice: This patent issued on a continued prosecution application filed under 37 CFR 1.53(d), and is subject to the twenty year patent term provisions of 35 U.S.C. 154(a)(2).
This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 07/686,319

[22] Filed: Apr. 16, 1991

Related U.S. Application Data

[63] Continuation of application No. 07/408,173, Sep. 15, 1989, abandoned, which is a continuation of application No. 07/038,817, Apr. 15, 1987, Pat. No. 4,953,085.

[51] Int. Cl.⁶ ..................................................... G06F 17/60
[52] U.S. Cl. ................................ 705/36; 705/35; 705/37; 705/38
[58] Field of Search .............................. 364/408; 705/35, 705/36, 37, 38

[56] References Cited

U.S. PATENT DOCUMENTS

| | | |
|---|---|---|
| 3,634,669 | 1/1972 | Soumas . |
| 3,697,693 | 10/1972 | Deschenes et al. . |
| 4,334,270 | 6/1982 | Towers . |
| 4,346,442 | 8/1982 | Musmanno . |
| 4,376,978 | 3/1983 | Musmanno . |
| 4,597,046 | 6/1986 | Musmanno et al. . |
| 4,642,767 | 2/1987 | Lerner . |
| 4,722,055 | 1/1988 | Roberts . |
| 4,742,457 | 5/1988 | Leon . |
| 4,752,877 | 6/1988 | Roberts . |
| 4,774,663 | 9/1988 | Musmanno . |
| 4,953,085 | 8/1990 | Atkins . |

OTHER PUBLICATIONS

Woodwell, Donald R., *Automating Your Financial Portfolio*, (Dow–Jones–Irwin 1983).
Bierman, Harold; Bonini, Charles P.; Hausman, Warren H., *Quantitative Analysis for Business Decisions*, (Irwin, Inc. 1977), Chapters 10,12,24.
"Funds Allocation System", Software Update, International Business Machines Corporation, 1985.
"Analysis Extension", Execucom Systems Corporation, 1986.
"Dialing for Profits", Personal Computing, May 1986 p. 180.
"A Financial Planner With Nerves of Silicon", Business Week, Oct. 2, 1985, p. 108.
"Learning About Artificial Intelligence", Institutional Investor, Jul. 1986, p. 209.
"What the Taxman Giveth, the Taxman Taketh Away", Financial Times, Mar. 12, 1984, p. 10.
"A Home Found for Your Money", Financial Times, Feb. 1, 1986, p. XI.
"Well Endowed? Don't Believe It", Financial Times, Jun. 29, 1985, p. VIII.
Fleet Norstar Financial Group, "Westminster Account" brochure.
Fayetle Hickox, Learning about artificial intelligence, Jul. 1986; pp. 209–210.
IBM, "Fund allocation system" Dec. 1985.
Daniel Wiener, "Software packages for investors" 1987, pp. 185–188.
Introduction to Automated Data Processing; Wanous S.J.; Wagner Gerald E.; Hallam, Stephen F.; 1979 pp. 88–93.

*Primary Examiner*—Gail O. Hayes
*Assistant Examiner*—William N. Hughet
*Attorney, Agent, or Firm*—Pennie & Edmonds LLP

[57] ABSTRACT

A personal financial management program is disclosed for implementing, coordinating, supervising, analyzing and reporting upon investments in an array of asset accounts and credit facilities within a client account. Through a mathematical programming function the client specifies his financial objectives, his risk preference, forecast of economic and financial variables, and budgetary constraints. The mathematical programming function suggests to the client a portfolio of investment and credit facilities to best realize his financial objectives over a defined time horizon. In the preferred embodiment the central structural element of the financial account is a mortgage secured by the client's home and one or more asset accounts. Client funds that would normally be used to amortize the mortgage may be alternatively used to increase the value of a designated asset account. The client account is imbalanced if the client's borrowing power is less than the minimum borrowing power specified by the financial institution. If the account is imbalanced, the client may reallocate the distribution of assets and liabilities within the client account and/or modify a set of constraints on the client account. If the client account is still not balanced after modification of the account, the system initiates a liquidation procedure.

22 Claims, 16 Drawing Sheets

SYSTEM FOR MANAGING FINANCIAL ACCOUNTS BY A PRIORITY ALLOCATION OF FUNDS AMONG ACCOUNTS

CROSS-REFERENCE TO RELATED APPLICATIONS

This application is a continuation of U.S. patent application Ser. No. 07/408,173, filed Sep. 15, 1989 now abandoned, which is a continuation of U.S. patent application Ser. No. 07/038,817, filed Apr. 15, 1987 now U.S. Pat. No. 4,953,085.

BACKGROUND OF THE INVENTION

This relates to a method and apparatus which provides an integrated financial product package. This system is realized, in the preferred embodiment, when implemented on a real-time computer system, and accordingly will be described in such context. It will be understood, however, that the invention may be applied to numerous other contexts.

Secured lending against homes has been practiced for many years, and recently a host of new financial products has been introduced in an effort to make mortgage lending more attractive to financial institutions and to make housing more affordable to prospective homeowners. Despite the proliferation of new mortgage products in this intensely crowded and competitive area, prior practices have not been entirely successful in meeting the goals of both the mortgagor and the financial institutions. Moreover, product proliferation in the market for financial services has presented the consumer with a confusing array of choices without a convenient or mathematically correct means of selecting the best combination of financial services to realize the consumer's financial objectives.

Financial institutions have traditionally lent funds to individuals on a fully secured basis, with an interest rate greater than their own cost of funding the loan. In the last few years however, the financial industry has been deregulated and now it is possible for a variety of financial institutions and firms that market financial services (hereinafter referred to as "financial institutions") to sell an entire range of financial products. Thus, in addition to the traditional objectives of a mortgagee, many financial institutions now view mortgage lending as a vehicle to encourage the borrower to purchase one or more financial service products. Methods are needed, however, to facilitate the provision of such services.

From the point of view of the mortgagor, problems still remain with the relative inflexibility of the mortgage. The mortgagor is locked in to a payment schedule which typically extends over most of the years in which he is working.

The recently enacted Tax Reform Act of 1986 (TRA-86) has also affected the situation. While it eliminated many tax deductions and tax shelters, it provided for the continued deductibility of interest payments on mortgages up to the full amount of the cost of two homes and any improvements thereto. Moreover, certain insurance products, annuities, and pension plans continue to be attractive "tax-favored" investments under the new law.

Present mortgage practices, however, do not take advantage of deregulation of the financial services industry and the new tax laws and are not employed to offer the mortgagor a full range of financial services that would help him to maximize his financial return.

SUMMARY OF THE INVENTION

The present invention is a method and apparatus for effecting an improved personal financial management program incorporating means of implementing, coordinating, supervising, analyzing and reporting upon investments in an array of assets and credit facilities. Through a mathematical programming function the client specifies his financial objectives, a forecast of economic and financial variables, risk preference and the budgetary constraints to which he is subject. The mathematical programming function suggests investments and credit facilities to the client to best realize his financial objectives. Thus, the present invention provides clients a convenient, cost effective, and mathematically rigorous means of maximizing his or her financial well-being. The mathematical programming function presents the financial institution an easily definable means of managing client accounts that have potentially an infinite number of investment opportunities in a way that minimizes the detrimental aspects of enforcing compliance while satisfying the financial institution's objective.

In the preferred embodiment, the central structural element of this integrated financial product package is a type of mortgage that features a variable amortization schedule and is secured by the pledge of real property and one or more other assets. This mortgage is called a Home Owner's Preferred Equity (HOPE) mortgage. Unlike conventional mortgages which provide for regular amortization payments, the mortgage need not be amortized.

Rather, the system of the present invention gives the mortgagor the opportunity to maximize his investment earnings by a variety of means including distributing the monies that would normally be used to amortize the mortgage among assets that give him the greatest return. For example, the mortgagor, hereinafter referred to as the "client", has the option to use the funds that would otherwise have been used to amortize the mortgage to make a contribution to a pension or retirement account such as an IRA, KEOGH, S.E.P. or corporate pension plan. Alternatively, the client may purchase "tax favored" investments such as life insurance or annuities in which earnings on premium payments, or "insider buildup", are not taxed until they are withdrawn.

From the financial institution's perspective, the mortgage used in the system of the present invention is superior to the other forms of mortgages in that: (1) it offers the lender an additional source of liquid collateral that will, if properly invested, continually appreciate in value, (2) the mortgage establishes an account that will assist in the marketing of other financial service products that will produce additional fee revenue for the financial institution and (3) the mortgage should rapidly gain wide acceptance in the secondary market in the form of mortgage-backed securities or Real Estate Mortgage Investment Conduit (REMIC) form because of the mortgage's added security and longer average life.

At the same time, origination, administration and servicing of the mortgage of the present invention involves many more considerations than a conventional mortgage. For the system to operate properly, the home owner's total assets, as adjusted to provide the financial institution with a measure of security for its lending, must always be greater than some imposed minimum standard. Calculation of adjusted total assets requires the financial institution to determine the current value of each asset and multiply it by its current loan to value ratio. In practice, these values must be calculated and checked frequently to reflect a change in the value or quantity of any asset or liability which is part of the system. Thus, for example, if borrowing is made against the cash value of the client's insurance policy or if the value of the client's bond portfolio changes, the asset values must be re-calculated, a new borrowing power must be determined and the new borrowing power must be compared to the minimum borrowing power. If the asset value is less than the minimum, the client must modify one or more of his account components e.g. decrease his liabilities or increase the value of an asset account, to bring the total value into the permissible range.

The structure and complexity of the system of the present invention suggests that the system would be best implemented on a real time computer system. As described in its preferred embodiment below, the system provides a real time update of all the components which comprise the account and coordinates, supervises, analyzes and reports upon activities among the various system components.

BRIEF DESCRIPTION OF THE DRAWINGS

These and other objects, features and advantages of the invention will be more readily apparent from the following descriptions of the preferred embodiment of the invention in which.

DETAILED DESCRIPTION OF THE PREFERRED EMBODIMENT

In this section the basic structure of the preferred embodiment is first described. The economic impact realized by this system is then illustrated through the comparison of the preferred embodiment of the system of the present invention and a conventional mortgage. Information on the HOPE account is presented and the computer system and data structure of the preferred embodiment of the present invention is described. Finally, the different processes that comprise the preferred embodiment of the present invention—the mortgage origination and servicing processes, the transaction order process, calculation of the Home Owner's Mortgageable Equity Borrowing Power (HOMEPW), the Priority Asset and Liability Allocation Process, the Early Warning Process, the HOPE Account Compliance Routine and the Emergency Liquidation Procedure—are described.

Introduction

Figure 1:
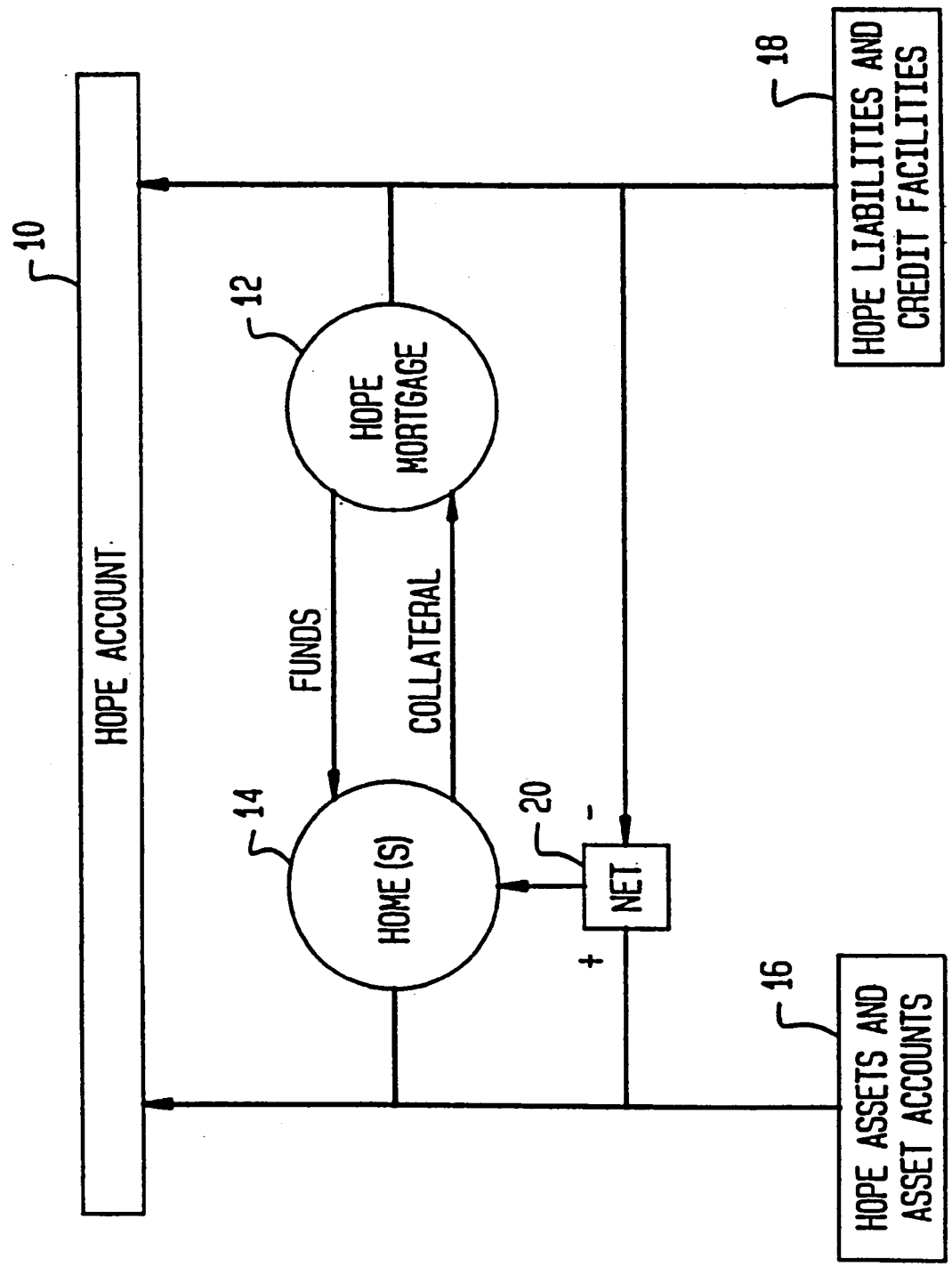
FIG. 1 depicts the basic structure of the financial management system of the present invention.

FIG. 1 illustrates the basic structure of the preferred embodiment. The financial management system for the Home Owner's Preferred Equity (HOPE) Account effects an improved personal financial planning and management program incorporating means of implementing, coordinating, supervising, analyzing, and reporting on investments in an array of assets and borrowings from a variety of credit facilities.

The HOPE account 10 is the central operating account through which all transactions are implemented, coordinated, controlled, analyzed and reported to the client. Through the HOPE account the client is provided with client reports updated on a real time basis, portfolio management and financial services, including personal financial planning services.

The core element of the system is a unique type of mortgage, referred to as a Home Owner's Preferred Equity (HOPE) Mortgage 12, which is secured by one or more of the client's homes 14 and one or more other assets or asset accounts 16. The system also includes liability accounts and credit facilities 18.

The client's home(s) 14 is the primary source of collateral for the HOPE mortgage. The system provides the client-the opportunity to make increased investments in his assets or asset accounts 16 instead of decreasing the principle of the mortgage 12. The Net Equity Total (NET) 20 is equal to the difference between the sum of all assets 16 and the sum of all liabilities 18, excluding the value of the client's home 14 and mortgage 12. The NET and the home(s) as adjusted by their respective loan to value ratios are available to be used as collateral for the HOPE mortgage 12. By allowing the client to invest monies that would be used to amortize a conventional mortgage into other assets the client can increase his investment income and net worth after payment of taxes.

Through the system of the invention the client can optimize the allocation of personal assets and liabilities to maximize his net worth over a period of time by endeavoring to maximize the value of the home or homes that can be acquired by an individual given a certain income level, maximize the net after-tax income on investments, maximize the savings for retirement and minimize and defer the payment of personal income taxes.

The following example, which compares a conventional mortgage to the mortgage in the system of the present invention, illustrates the economic impact of the system. Assume the following:

(1) both mortgages are for $100,000 for a term of 30 years at a fixed rate of 10% with equal monthly amortization payments;

(2) at the initiation of the mortgage, the client's sole asset is the amount required to make a down payment on his home and the client's sole source of initial income in his salary;

(3) a "pension account", such as a Keogh, SEP or 401(K) plan, and an illustrative asset, "insurance policy" both produce returns of 8% per annum compounded. No taxes are payable on the "pension account," the "insurance policy" or earnings thereon until distributions are made. The amount invested each year in the pension account and the insurance policy are equal to, respectively, the amount of the required amortization payment of the conventional mortgage and the tax savings generated by the system of the present invention;

(4) the taxes paid are based upon the taxes payable for the head of a household filing jointly with three dependents when TRA-86 is fully phased-in and there are only two tax brackets of 15% and 28% and a 5% tax surcharge for higher income tax payers;

(5) the home is assumed to appreciate at 4% per annum;

(6) the client's net worth is equal to the value of the home, the pension account, and the insurance policy less the amount of the outstanding mortgage;

(7) the client's annual income is initially $50,000 and increases by 5% each year.

TABLE 1

| Year 1 | Conventional Mortgage | System of the Present Invention |
|---|---|---|
| Gross Taxable Income | $50,000 | $50,000 |
| Interest Payments | $9,833 | $10,000 |
| Amortization Payments | $3,334 | $0 |
| Outstanding Loan Balance | $96,666 | $100,000 |
| Pension Account Investment | $0 | $3,334 |
| Pension Account Balance | $0 | $3,467 |
| Net Taxable Income | $40,167 | $36,666 |
| Taxes Paid | $4,375 | $3,850 |
| Net Income After Tax | $35,792 | $32,816 |
| Disposable Income | $32,458 | $36,150 |
| Tax Savings Invested In Insurance | $0 | $500 |
| Insurance Policy Balance | $0 | $521 |
| Market Value of Home | $120,000 | $120,000 |
| Total Disposable Income | $32,458 | $36,150 |
| Net Worth | $23,334 | $23,988 |

Table 1 is illustrative of the client's financial statement for the first year under a conventional mortgage and under the system of the present invention.

In accordance with the present invention, the $3,334 that would otherwise be used annually to amortize the mortgage is instead contributed to a pension account which is not taxed in that year. Thus the client's net taxable income is $36,666 as opposed to the $40,167 when the $3,334 is realized as personal income and used to amortize the mortgage. Correspondingly, the taxes paid are lower and the client's disposable income is greater. In addition, the tax savings of $500 is invested in a tax favored investment such as a single premium whole life insurance policy that yields a balance of $521 at year end.

TABLE 2

| Year 2 | Conventional Mortgage | System of the Present Invention |
|---|---|---|
| Gross Taxable Income | $52,500 | $52,500 |
| Interest Payments | $9,500 | $10,000 |
| Amortization Payments | $3,334 | $0 |
| Outstanding Loan Balance | 93,332 | $100,000 |
| Pension Account Investment | $0 | $3,334 |
| Pension Account Balance | $0 | $7,226 |
| Net Taxable Income | $43,000 | $39,166 |
| Taxes Paid | $5,093 | $4,225 |
| Net Income After Tax | $37,908 | $34,941 |
| Disposable Income | $34,574 | $38,275 |
| Tax Savings Invested In Insurance | $0 | $500 |
| Insurance Policy Balance | $0 | $1,048 |
| Market Value of Home | $124,800 | $124,800 |
| Total Disposable Income | $67,031 | $74,425 |
| Net Worth | $31,468 | $33,111 |

Referring to Table 2, in the second year the client gains the same benefits using the system of the present invention. The client now has an insurance investment balance of $1,048 and a pension account balance of $7,226.

TABLE 3

| Totals After 30 Years | Conventional Mortgage | System of the Present Invention |
|---|---|---|
| Gross Taxable Income | $3,321,942 | $3,321,942 |
| Interest Payments | $149,971 | $300,000 |
| Amortization Payments | $100,000 | $0 |
| Outstanding Loan Balance | $0 | $100,000 |
| Pension Account Investment | $0 | $100,000 |
| Pension Account Balance | $0 | $417,577 |
| Net Taxable Income | $3,171,971 | $2,921,922 |
| Taxes Paid | $728,798 | $650,563 |
| Net Income After Tax | $2,443,173 | $2,271,359 |
| Disposable Income | $2,343,173 | $2,371,379 |
| Tax Savings Invested In Insurance | $0 | $29,806 |
| Insurance Policy Balance | $0 | $109,023 |
| Market Value of Home | $374,235 | $374,235 |
| Total Disposable Income | $2,343,173 | $2,371,379 |
| Net Worth | $374,238 | $800,835 |

Referring to Table 3, over thirty years the client's total disposable income is $2,371,379 compared to a disposable income of $2,343,173 for a person in like circumstances who is paying off a 30 year conventional mortgage. The principal amount owed on the home is still $200,000. However, the client has accrued a pension account balance of $417,577 and an insurance policy balance of $109,023. The economic impact of the system is clearly realized by comparing the net worth of the client using the system of the present invention and that of a person who purchased a home by taking out a conventional mortgage. Through the system of the present invention the client may more than double his net worth.

The economic advantages of the system are proportionately dramatic for a client initially earning $100,000 a year, increasing 5% annually. Using the same assumptions stated in the example but with a mortgage for $200,000, the $6,667 that would be used annually to amortize the mortgage contributed to a pension account which is not taxed until distributions are made from the account after the client retires. As a result, the client accumulates $785,713 (including interest) in a pension or retirement account. In addition, the client accumulates an insurance policy investment balance of $256,776. As a result, after 30 years of payments the client's total disposable income is $3,588,342, as opposed to a disposable income of $3,405,383 for a person making payments on a 30 year conventional mortgage, and his net worth is $1,599,965, which is more than double the $748,486 net worth of an individual under similar financial conditions after completion of payments on a 30 year conventional mortgage.

To implement such a system capable of producing these useful improvements in the planning and management of personal financial assets and credit facilities requires considerable change in the present methods for originating, administering, and servicing mortgages. The present invention details techniques for accomplishing these changes to provide individual consumers the ability to maximize the returns from the management of their personal financial resources while also providing appropriate security for the financial institution.

The HOPE Account

Table 4 illustrates the type of assets or asset accounts that a client may have within the system some of which may be collateralized to form additional security for the HOPE mortgage and into which funds that might ordinarily be used to amortize a conventional mortgage may be invested pursuant to the terms of the HOPE mortgage. The asset or asset accounts include insurance and annuities (I), pension and deferred compensation accounts (II), banking accounts (III), mutual funds (IV), brokerage accounts (V) and other assets and asset accounts (VI). Specific forms of each of these types of assets are enumerated in Table 4.

TABLE 4

HOPE ASSETS AND ASSET ACCOUNTS

| I<br>Insurance and Annuities | II<br>Pension and Deferred Compensation | III<br>Banking Accounts | IV<br>Mutual Funds | V<br>Brokerage Accounts | VI<br>Other Assets |
|---|---|---|---|---|---|
| Life | IRA | Checking | Money Market | Stocks | Trusts |
| Health | 401(K) | Savings | Equity | Bonds and Fixed Income | Other real Property |
| Accident/ Casualty | SEP | Other | Fixed Income | Options | Art and Antiques |
| Annuities | Keogh | | International | Commodity Futures | Private Equity Holdings |
| Other | ESOP<br>Other | | Other | Other | Other |

Table 5 lists several types of liabilities and credit facilities available through the HOPE account which include, but are not limited to, margin account borrowing, credit and debit cards, equity access loans and credit facilities, insurance and annuity policy loans, as well as other forms of liabilities and credit facilities. Specific forms of these liabilities and credit facilities are also set forth in Table 5.

TABLE 5

HOPE LIABILITIES AND CREDIT FACILITIES

| I<br>Margin Account Borrowing | II<br>Credit and Debit Cards | III<br>Equity Access Loans and Credit Facilities | IV<br>Insurance and Annuity Policy Loans | V<br>Other |
|---|---|---|---|---|
| Against Equity Securities | Visa ™ | Equity Access Loans and Credit | Insurance and Annuity Policy Facilities | Student Loans |
| Against Fixed Income Securities | Mastercard ™ | Second Mortgage | Against Insurance Policies | Pre-Existing Debt |
| N.R.V. of Options Account | Diners Club ™ | HOPE Loan secured by NET | Against Annuities | |
| Other | American Express ™ | HOPE Loan Secured by Account Assets | Other | |
| | Discover ™<br>Other | Other | | |

The HOPE account provides the client the flexibility to maximize his financial performance and realize his financial objectives. Through the system of the invention financial services and products can be automatically received and dispensed within the HOPE account framework. For example, withdrawals, deposits and transfers may be made, securities, commodities and debt instruments may be purchased, sold and transferred in and out of the account, financial agreements such as insurance and annuity contracts and policies may be purchased or sold within the framework of the HOPE account, the agreements, contracts and policies purchased may be transferred to safekeeping accounts monitored within the HOPE account system, a wide variety of different types of credit facilities and loans may be advanced to clients of the HOPE account and proceeds from credit facilities and loans received outside the framework of the HOPE account may be transferred to the account for use in the acquisition of other assets.

The system of the present invention can provide the client periodic account activity reports that clearly display the details with regard to each transaction conducted within the account such as a purchase and sale of securities, withdrawal or deposit of cash, acquisition of annuities, insurance policies and access to one or more types of credit facilities. The client's earnings can be categorized and summarized according to interest, dividends, asset disposition, or wages. Every transaction executed, for example, on a debit or credit card would be entered in the HOPE monthly account statement so that an accurate ongoing list of expenses and the type of expenses will be presented automatically to the client at the end of every month and a detailed summary would be presented at year end for assistance in preparing personal tax returns.

The system of the invention also provides a client with a variety of standard accounting information which has commonly been used in a business environment but has seldom been appropriately applied to personal financial reporting. For example, the system may provide a client with sources and uses of funds statements, personal balance sheets indicating the market value of assets and liabilities in each category and illustrating the individual's net worth, a profit and loss report indicating net income for the period and year to date and an income and expense report comparing actual results to budgeted amounts.

Through the system of the invention the client can also access a host of ancilliary investment news, information, advice, and counseling. In particular, a client can access a current news and information data base such as Dow Jones News Retrieval™, The Source™ and Compuserve™.

Clients of the HOPE account can also receive personal financial planning and analysis assistance by means of an interactive expert computer system and direct consultation with financial planners. The client may also receive accounting and tax preparation assistance through an interactive computer system with on-line expert computer software assistance with the opportunity to utilize certified public accountants. The client may also receive tax, estate and legal counseling advice through an interactive expert system that has full access to a data base such as LEXIS™ including all applicable tax code rules and regulations, ERISA regulations and applicable case law, etc.

Depending upon the number of HOPE client accounts and the complexity and size of each account, the system may be implemented on a microcomputer, minicomputer, mainframe computer or any combination of the three. Examples of such systems are the IBM Personal Computer AT manufactured by International Business Machines, the VAX series of minicomputers including the VAX 8700 manufactured by Digital Equipment Corporation, and IBM 3090 manufactured by International Business Machines.

The HOPE Computer System and Data Structure

Figure 2:
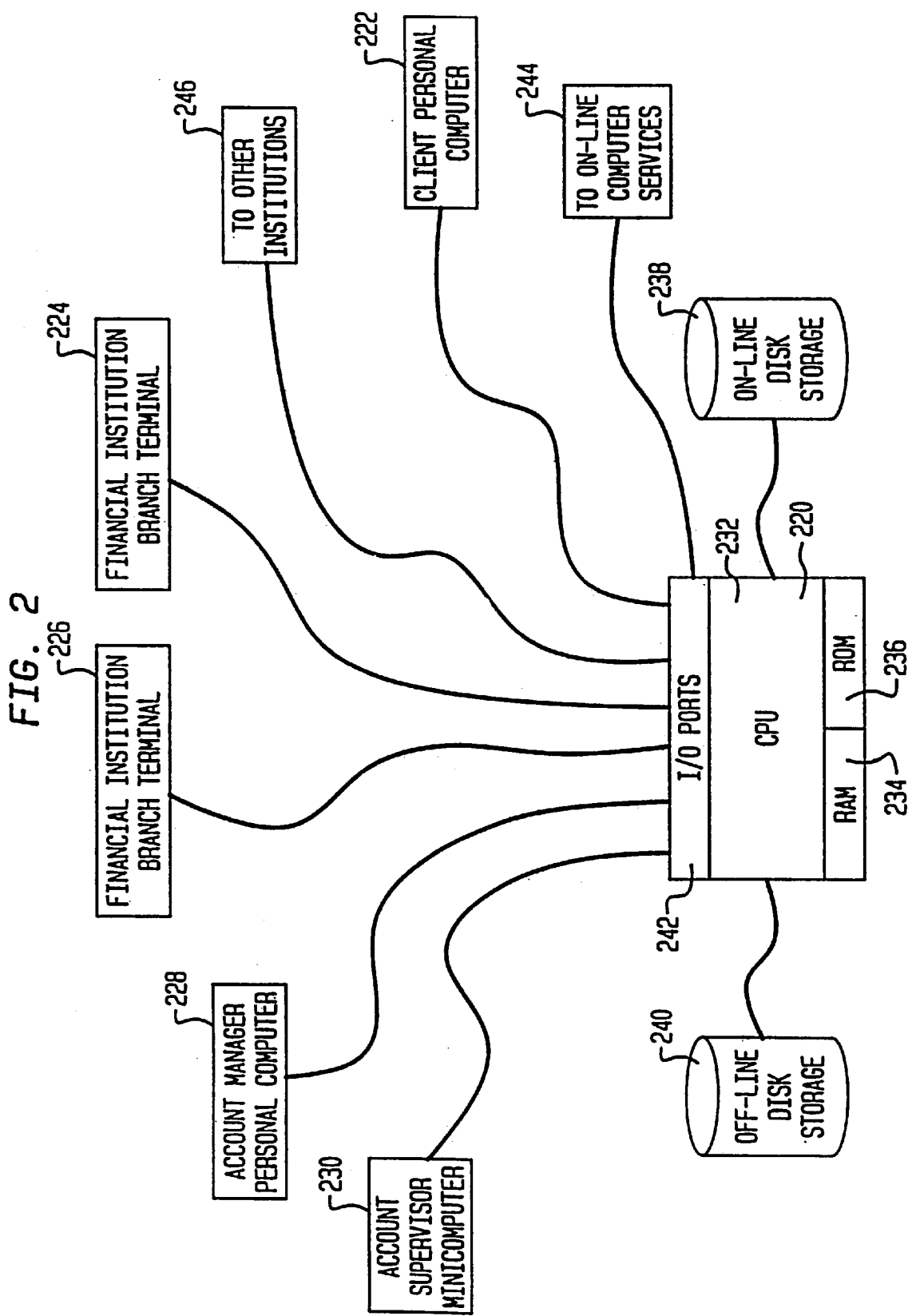
FIG. 2 illustrates the basic structure of the computer system to be used for the method and system of the present invention.

Referring to FIG. 2, the HOPE account system illustratively comprises a central computer 220, which may be a minicomputer or mainframe connected to a plurality of terminal personal computers (PC) or minicomputers 222, 224, 226, 228, 230. The central computer 200 stores the HOPE account information as well as processes and updates the HOPE account components. The personal computers or low-end minicomputers may be located at branch offices 224, 226 of the financial institution, at the desk of the HOPE account manager 228, HOPE account supervisor 230 and at the home of the client 222. These computers may act as a terminal to the central computer to record and store reports issued by the system during processing and may perform local processing of information particular to the user of the personal computer. For example, the HOPE account manager may have a PC at his desk through which the manager can communicate with the central computer, receive client reports from the central computer and perform types of personal financial planning and analysis on the HOPE account that need not typically be performed on the central computer.

The computer system 220 comprises a Central Processing Unit (CPU) 232, Random Access Memory (RAM) 234, Read Only Memory (ROM) 236, on-line 238 and off-line 240 storage and communication and input/output (I/O) ports 242.

The I/O ports 242 provide the means for communications with the client, networks and other financial systems and services 242. For example, the system may connect to a network to access news or financial information such as stock prices, or communicate with a brokerage firm for the processing of a transaction. The client, through a terminal at the financial institution's office 224, 226 or through a personal computer with a modem located in the client's home 222, may communicate with the system to inquire about the status of his account, check news or financial information, or initiate a transaction.

Other banks, financial service institutions and insurance companies 246 may communicate with the HOPE account's system in order to transfer asset and liability holdings or verify asset or liability holdings.

Figure 3:
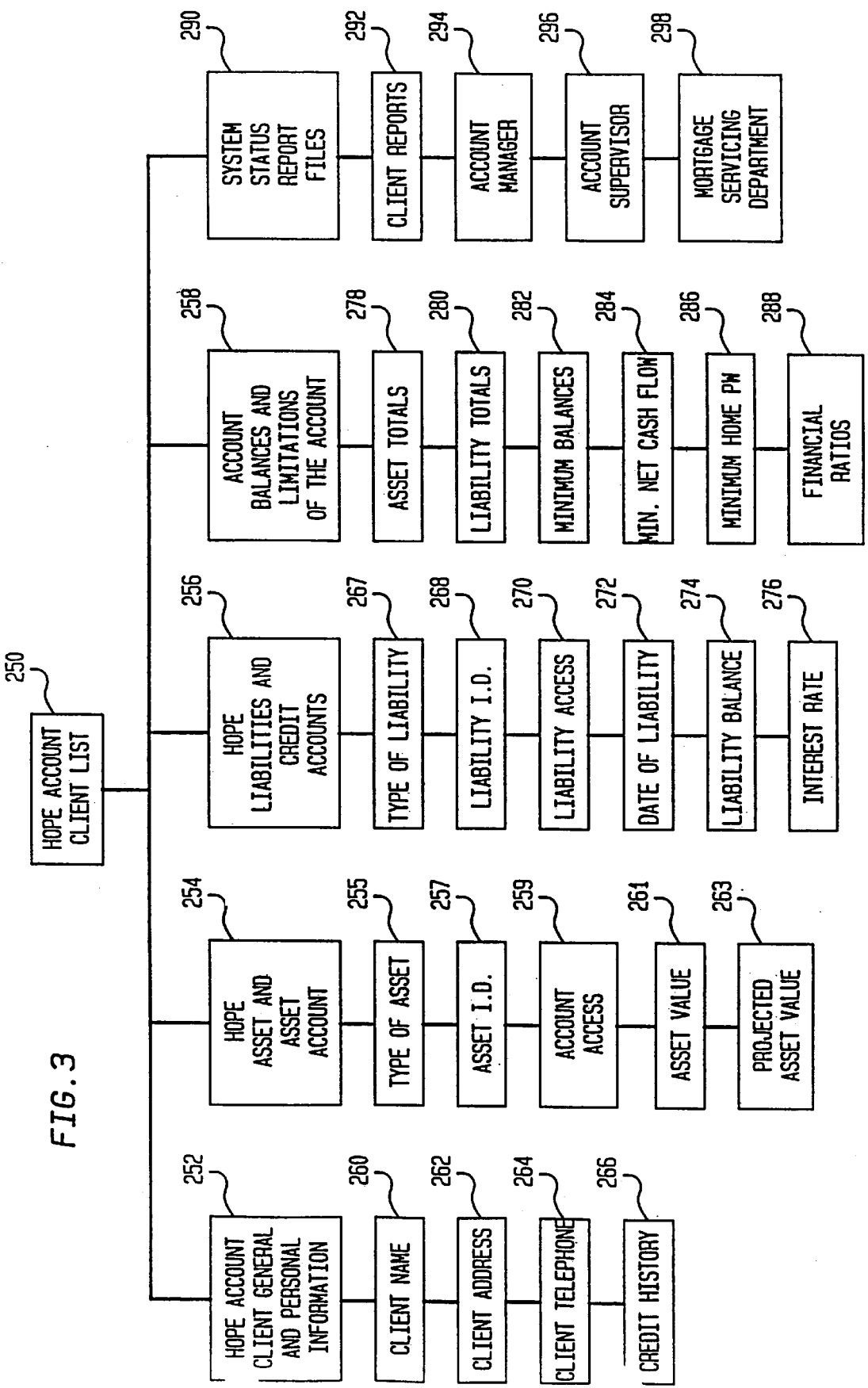
FIG. 3 illustrates the basic data structure of the present invention.

The client account information is stored in a database on the computer system. The system is not limited in the types of databases that can be utilized. Referring to FIG. 3, the client data illustratively are organized in the database into four areas or files indexed according to HOPE account client numbers 250: general and personal information of the client 252, HOPE asset information 254, HOPE liability and credit account information 256, HOPE account balances, account limitations and constraints 258.

The HOPE general and personal information file 252 contains personal information on each client such as name 260, home and work address 262, home and work telephone number 264 and past credit history 266. The HOPE asset information file 254 contains all the data regarding each client asset and asset account which is part of the HOPE account. Each asset is described according to a variety of data including the type of asset 255, asset identifying information 257 (e.g. policy numbers, bank and bank account number), how it can be accessed 259 (e.g. bank or financial institution routing and transit numbers), the current value of the asset 261 and projected future value of the asset 263.

The HOPE account liability and credit account file contains the type of information similar to the account asset file including the type of liability 267, identifying information on the liability 268, liability access 270, date of origination of the liability 272, the liability balance 274 and the interest rate 276 on the liability.

The HOPE account balance and account limitations files 258 contain HOPE balance information such as asset totals 278, liability totals 280 and account limitations such as minimum imposed balances 282, minimum imposed net cash flow 284, the imposed minimum HOME borrowing power (MIM) 286 and financial ratios 288.

The data structure also allocates files for storage of system status reports 290 that are issued during processing to the client and the financial institution departments and personnel. This information is stored for access and reference by the party to whom the information is reported. For example, a file is provided for each client for the storage of system reports issued to that client 292. The reports are then accessible only by that particular client. The HOPE account manager 294 and supervisor 296 may also have files allocated to them as well as the various departments e.g., the mortgage servicing department 298 in the financial institution. These files, in a fully distributed system, may be located on the central computer or on the personal computers or minicomputers networked to the central computer.

Although the HOPE account is described comprising four main areas or files organized according to the HOPE client number, many other data structures may be realized within the scope of the present invention. For example, the data may be further distributed into a multiplicity of subfiles indexed according to predetermined data such as client number and type of asset, or the data may be organized in a data structure that is less distributed.

As noted previously, the central element of the HOPE account system is the HOPE mortgage. Referring to Table 6 the HOPE mortgage can be described by various elemental categories including: forms of collateral, legal documentation and financial terms and conditions.

TABLE 6

HOPE MORTGAGE ELEMENTS

| I<br>Forms of<br>Collateral | II<br>Legal<br>Documentation | III<br>Financial<br>Terms &<br>Conditions |
|---|---|---|
| Home(s) | HOPE Mortgage<br>Master Agreement | Minimum Principle<br>Outstanding<br>Balance |
| Insurance<br>Annuities | Individual Secured<br>Collateral<br>Agreements | Required Interest<br>Payment |
| Pension and<br>Deferred<br>Compensation<br>Plans | Cross-collateral-<br>ization Agreements | Amortization<br>Payment or<br>Alternative<br>Investment |
| Banking<br>Accounts | Individual Asset<br>Account Agreements | Fees & Expenses |
| Mutual Funds | Other | Term of<br>Mortgage |
| Other | | Other |

The acceptable forms of collateral illustratively include: one or more homes which would be valued for purposes of collateralization at a percentage of their appraised fair market value, insurance and annuity policies valued for purposes of collateralization at their net fair market or cash redemption value, various forms of pension and deferred compensation plans and accounts valued for purposes of collateralization at their net fair market value, banking accounts including checking and savings accounts to be valued for purposes of collateralization at their net account balances, mutual funds to be valued for purposes of collateralization at the net fair market redemption value and other forms of alternate collateral.

The required legal documentation for the HOPE mortgage may include, but is not limited to, a HOPE mortgage agreement, individual security agreements for each of the various assets that are used as collateral for the HOPE mortgage, cross-collateralization agreements that allow the value of various asset and asset accounts to be used to support borrowings or indebtedness and individual asset or asset account agreements which include the contractual agreements establishing and setting forth the operations of the asset accounts.

The financial terms and conditions of the HOPE mortgage which are substantially new and different from those of conventional mortgages include: a continuous real time determination of the permissible outstanding balance of the mortgage which takes into consideration the value of all assets used to collateralize the mortgage; interest payments which can be either in the form of fixed, floating, or a combination of fixed and floating interest payments as determined by the client and lending institution; the required amortization payments, if any, which may, in the preferred embodiment of the invention, constitute zero amortization payments in exchange for the client making alternative investments in assets or asset accounts of his choice; the term or life of the mortgage which would in many instances be of a term of 15 to 30 years but could be different dependent upon agreements reached by the lending institution and the client; required fees and expenses for the initiation and continuation of the HOPE mortgage including origination fees, servicing fees, closing costs and prepayment penalties; and other terms and conditions as may be required.

Mortgage Origination and Servicing—Overview

Figure 4:
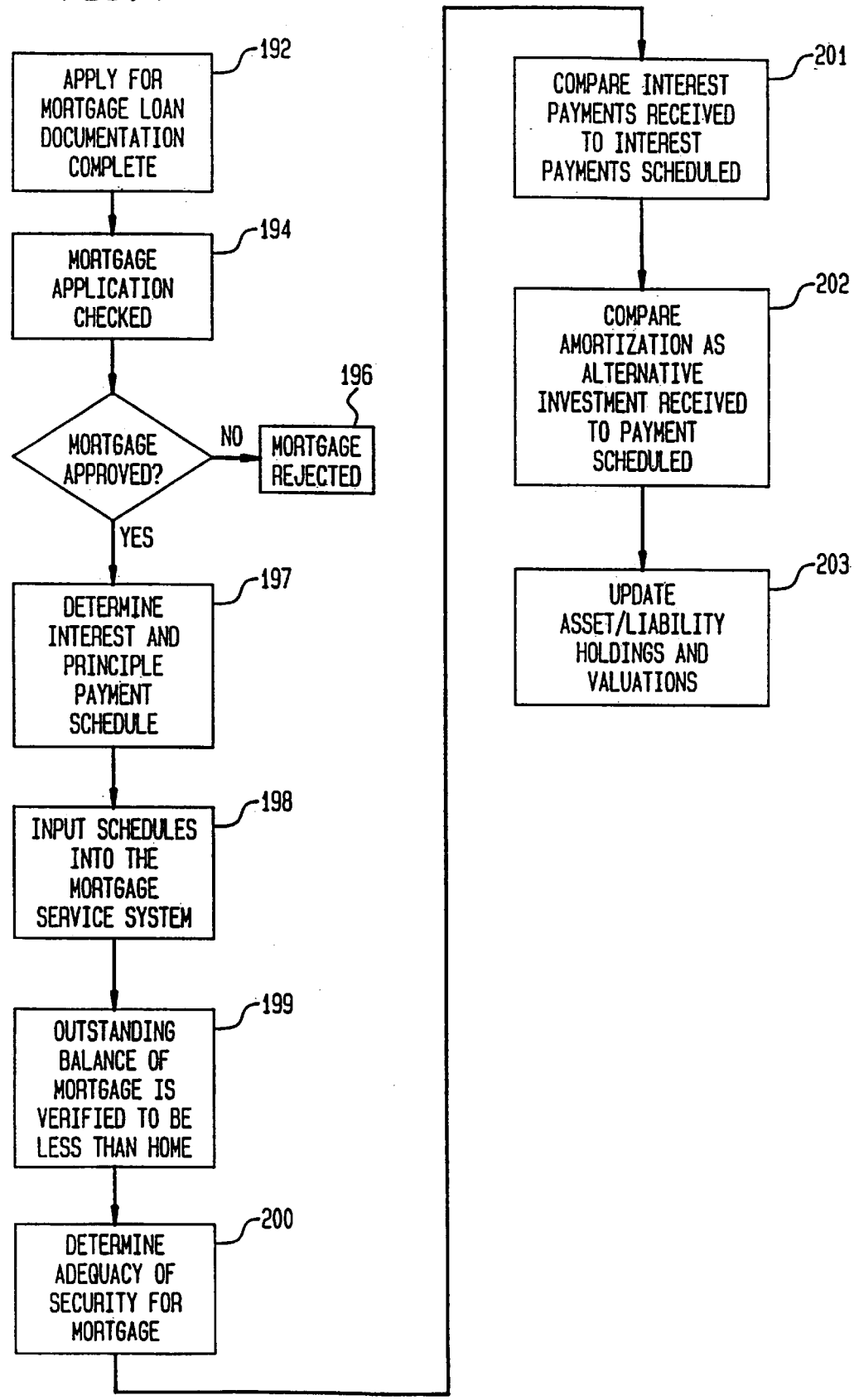
FIG. 4 generally depicts the primary elements of the mortgage process.

Referring to FIG. 4, once the mortgage applicant completes the loan documentation 192, the loan origination documentation is checked 194 and the mortgage is approved or rejected 195, 196. If the mortgage is approved, the scheduled interest and principal payments are determined 197 and input into the mortgage service system so that continuous real time verification and cross-verification can be performed to detect any irregularities or delinquencies in payments 198. In servicing the HOPE mortgage, the outstanding balances of the HOPE mortgage must be processed in real time and compared to the total value of HOME 199 (HOME equals NET plus the net fair market appraisal value for purposes of collateralization of the client's homes). The adequacy or inadequacy of security for the HOPE mortgage 200, must be determined. The required interest payments received compared to those scheduled at the time of the origination of the HOPE mortgage 201, must be calculated. The updated required amount of principal amortization payments or additional alternative investment required must be calculated and compared to the amounts received 202. Updated documentation on asset and liability holdings and valuations must be generated 203. In addition, other variables must be periodically calculated and verified to satisfy applicable regulatory authorities and to prevent unauthorized transfers or creation of debit balances in excess of applicable credit limits.

Figure 5:
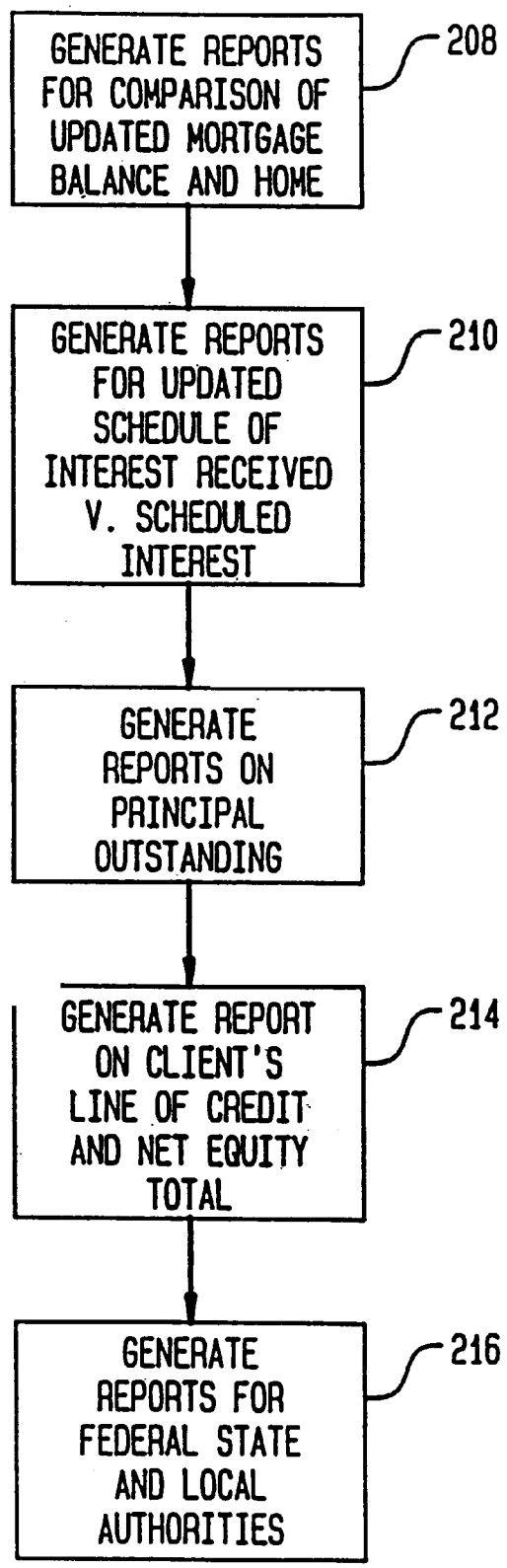
FIG. 5 depicts the mortgage reporting process.

Internal, regulatory and client reporting is an integral part of the system of the present invention. Internally these reports must be updated on a real time basis although the client and regulatory authorities may only receive a report on a periodic basis and when there is a discrepancy or delinquency. As illustrated in FIG. 5, daily updated HOPE mortgage balances must be compared to the HOME value 208 and reported. Likewise, updated schedules of interest received versus interest payments scheduled 210 must be reported. Also updated reports of the amount of principal outstanding 212 must be reported. The client's line of credit and NET 214 must be calculated and reported. There are reports generated for the applicable federal, state and local authorities in compliance with banking, insurance, ERISA and securities laws 216.

Mortgage Origination

Figure 6:
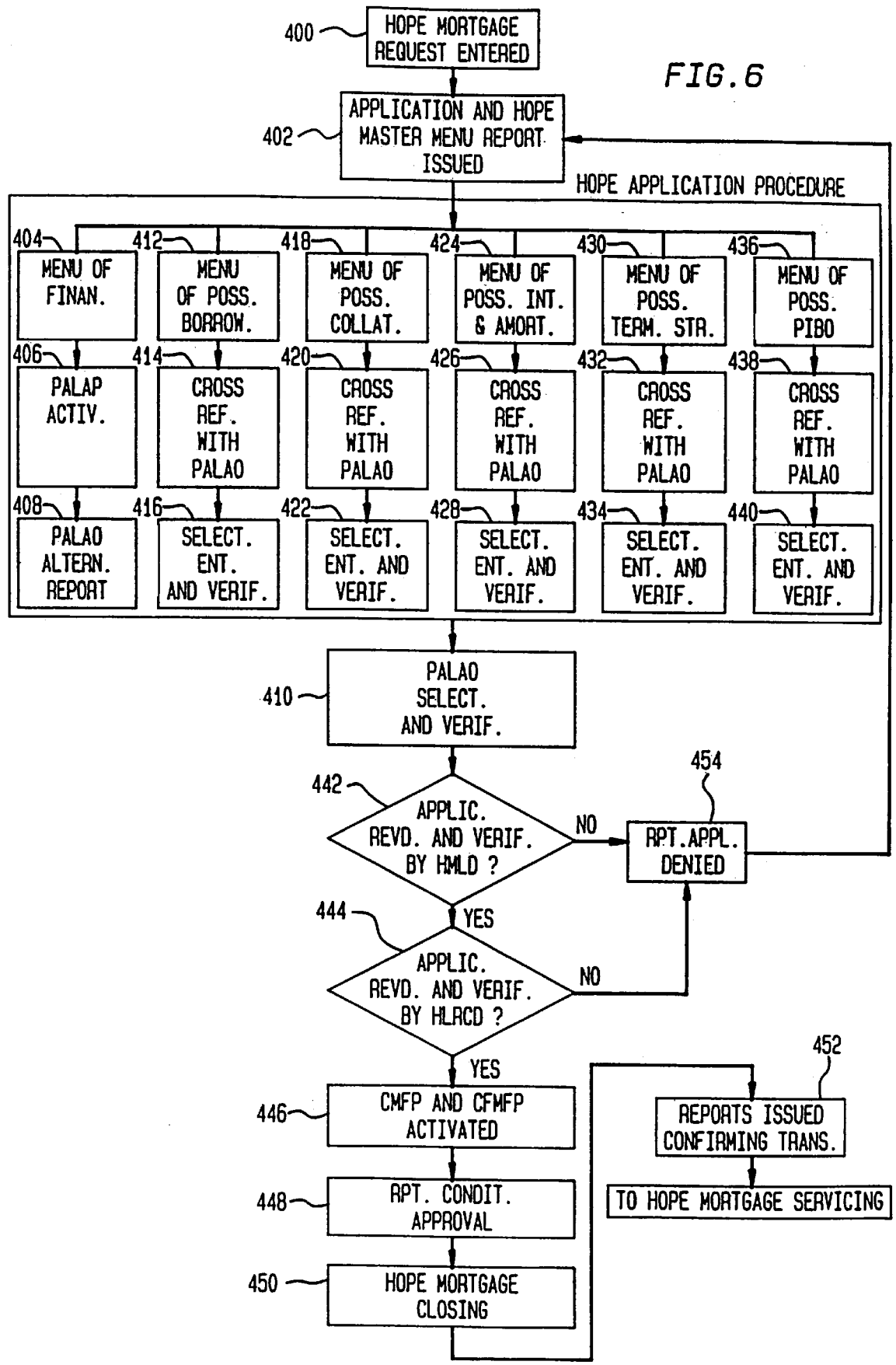
FIG. 6 depicts the mortgage origination process.

FIG. 6 depicts in greater detail the HOPE Mortgage Origination Process of FIG. 4 which is initiated when the HOPE client requests a HOPE mortgage 400. The HOPE mortgage application process illustrated assumes that the applicant (client), has access to the HOPE central computer through a computer terminal or terminal-emulating computer. A HOPE mortgage application menu and the HOPE mortgage master menu are presented to the client 402. These two menus include a number of chapters or sub-menus which closely resemble information that must be completed to originate a standard mortgage and others that are uniquely attributable to the HOPE mortgage.

The client reports his qualifications, including financial and employment background, assets owned, anticipated income, etc. 404. This information is standard to almost all mortgage applications. Much of the data may be automatically inputted from the system data structure into his application insofar as within the system data structure the HOPE account data files already have information on all assets and liabilities, anticipated income, etc. from the establishment of his HOPE account.

The Priority Asset and Liability Allocation Process (PALAP) is then initiated 406. As will be explained subsequently in conjunction with FIG. 10, PALAP utilizes a type of mathematical programming to perform personal financial planning and analysis and establish a system of priorities for the allocation of stocks (quantities) and flows of financial assets and liabilities for each HOPE client account. Through PALAP, the system generates for the client a suggested Priority Asset and Liability Allocation Order (PALAO) 408 which is the optimal PALAO for the client. Financial statements based on the recommended PALAO are provided to the client to illustrate the effect of the proposed financial plan. A client's PALAO provides the guidelines by which the financial institution governs, regulates and monitors the client account. Alternative PALAOs together with financial projections based upon those alternative PALAOs may be made available to the client for his review and subsequent selection during the remainder of the mortgage application process.

The client is then presented a menu from which the client may select his desired level of borrowing secured by his home or homes and one or more other assets 412. This level of borrowing may be of a declining amount over a period of time (i.e., with a certain amount of amortization), it may be for a fixed amount (i.e., non-amortizing) or it may be of an increasing amount provided that the client will be able to support the additional amounts of borrowing in the future by increasing the amount of collateral in the account through appreciation of assets currently held or by adding additional assets or income to his HOPE account over time. The level of borrowing may be subject to satisfaction of certain conditions, (i.e., income levels, levels of appreciation or depreciation of capital assets, etc.). The available borrowing alternatives are presented and cross-referenced with PALAO alternatives 414 so that the client can observe how the different levels of borrowings affect his financial planning. Once the client selects the level of borrowing, the selection must be entered into the central computer and verified 416.

The client is then shown various proposed collateral selections from a submenu featuring those items 418. In addition to the home or homes that the applicant desires to use as collateral, he may name a number of other assets or asset accounts by cross-referencing to PALAO alternatives 420. In addition to selecting the assets to be used as collateral, the client must indicate and verify the proposed priority of collateralization of those assets. For example, after the homes are used to collateralize the borrowing, the client may wish the next type of collateral to be used to be money market account balances or bank account balances since they have a high loan to value ratio and do not offer low interest cost borrowing as is the case associated with loans against single premium whole life insurance policies and annuities. The client selects the assets to be used as collateral and the priority of collateralization, enters the selections into the central computer and verifies the selections 422.

A client is also presented a menu of potential interest and amortization schedules 424 which includes the priority of funding amortization payments and interests expenses on the proposed mortgage. The client may cross reference to the PALAO alternatives and the level of borrowings selected 426 to see the financial impact the various selections have. By cross referencing to the PALAO alternatives a variety of options are presented, and the client selects one of the options and verifies the interest and amortization schedules and the priority of funding amortization payments and interest expenses 428.

The client is also presented with a menu of potential term structures of the HOPE mortgage 430. The effects on the account of the different structures may be seen by cross referencing to the PALAO alternatives 432. The client enters the term structure selected and verifies his selection 434.

The client is then presented a menu of potential Priority Investment and Borrowing Orders (PIBO) 436 that are integrally interrelated to the PALAO presented in block 408. These alternatives may also be cross referenced to PALAO 438 to see the overall effect the different PIBO selections have on the client's account. Once the PIBO is entered and verified 440, the client selects, enters and verifies the PALAO 410. It should be noted that once the PIBO has been selected, the PALAO will be approximately determined because the PIBO and PALAO selected must be mutually compatible.

In practice, the client switches back and forth among the various menu screens and cross references the alternative PALAOs suggested in order to select a financial package that best meets his needs and objectives.

Completion of the preceding steps finalizes the application process and the completed application is submitted to the HOPE Mortgage Loan Department (HMLD) for review 442. If the application is approved by the loan department, the necessary documents are submitted for review by the HOPE Legal and Regulatory Compliance Department (HLRCD) 444. Upon approval, the Cash Flow and Collateral Monitoring and Forecasting Processes (CFMFP and CMFP) are activated so that any interim changes in either the value of the proposed collateral or the projected cash flow of the client can be determined prior to the time of closing of the mortgage 446.

Conditional approval of the mortgage is then reported to the client, the client's account manager, the mortgage loan origination department and the mortgage servicing department 448. A report documenting the approval is also issued to the HOPE account history file. If no adverse change is indicated by the cash flow monitoring and forecasting processes prior to closing, the HOPE mortgage will be closed 450 and reports of its closing will be issued 452.

If the mortgage application is rejected either by the loan department or the legal and regulatory compliance department, then approval is denied and a report is issued to the involved parties stating the reason for its denial. The client is then given the opportunity to make an alternate mortgage application at a later date if desired 454.

After the mortgage is closed, the primary responsibility for the ongoing process of monitoring and servicing of the HOPE mortgage belongs to the HOPE Mortgage Servicing Department (HMSD).

Mortgage Servicing

Figure 7:
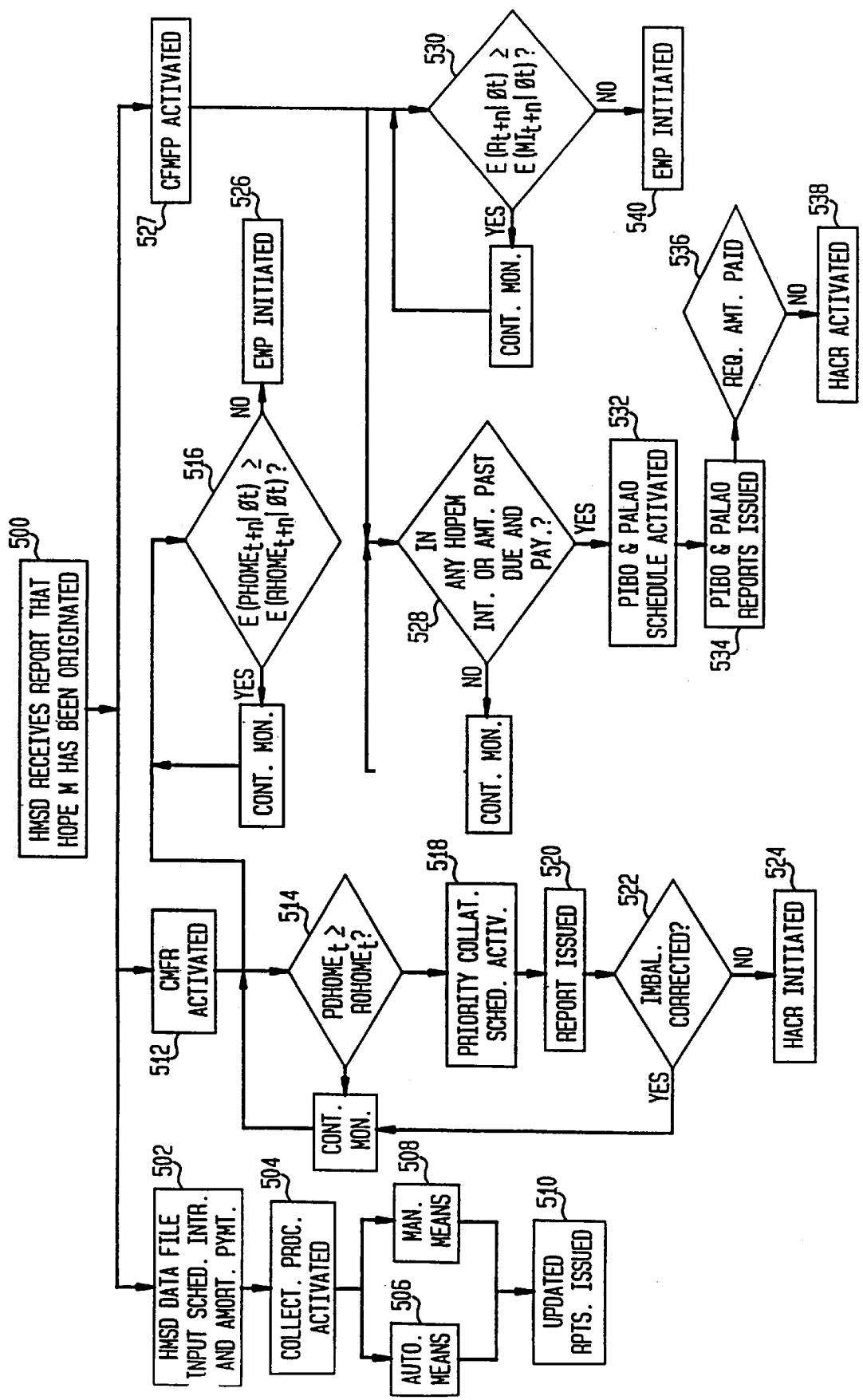
FIG. 7 depicts the mortgage servicing process.

Referring to FIG. 7, the HOPE mortgage servicing process is initiated as soon as a report is issued to the mortgage servicing department indicating that a mortgage has been originated 500. One aspect of the HOPE mortgage servicing process is virtually identical to the standard mortgage servicing process for a conventional mortgage. This is the collection activity indicated in blocks 502 through 510 with some slight variation due to certain unique attributes of the HOPE mortgage. In step 502, an interest and amortization schedule for the mortgage is input into the mortgage servicing department's data file. This schedule is used to monitor all collection activities 504 which may be done either by automatic or by a manual means 506, 508.

Most mortgage collection activities are currently executed manually, typically by sending a letter to the mortgagee advising him or her of the amount of payment due or recording receipt of a check for the amount of the payment. If the mortgage payment is not received on a timely basis, collection activities are initiated.

Because of the structure of the HOPE account, the client may elect an automatic means of payment, for example, the client's payroll may be debited for the amount of interest and/or amortization payments. Upon the collection or failure to receive the required funds, updated reports are issued to the client data file, the mortgage servicing department's data file and the master history file 510.

The unique aspects of the HOPE mortgage servicing process are necessitated by the wide variety of options available to the financial institution. Specifically, a variety of planning, coordinating, and supervisory activities must be initiated in order to make sure that the client remains in compliance with the terms and conditions of the mortgage in a constantly changing financial environment. To further aid both the client and the financial institution with regard to compliance, the system provides an early warning process in the event that it is forecast that there will be some future imbalance. The early warning process is discussed later in this specification.

As previously noted, prior to the funding of the mortgage, the collateral monitoring and forecasting process is activated 512. Two tests 514, 516 are performed on the client's net total assets or Home Owner's Mortgageable Equity (hereinafter called "HOME") which are defined as equal to the net fair market appraisal value of the client's homes plus the difference between the sum of all assets and the sum of all liabilities (excluding the value of the client's homes). First, in block 514 the amount of pledged HOME must be greater than or equal to the minimum required HOME. Second, in block 516 the amount of expected future pledged HOME (at time t+n) based upon the information currently available at time t must be greater than or equal to the expected value of the minimum required future HOME (at time t+n) given the information base currently available at time t $((E(PHOME_{t+n}|\phi t) \geq (E(RHOME_{t+n}|\phi t))$. The variable "t" represents the current time period, "E" is the expected value operator, "$\phi_t$" is the information set assumed to be fully available at time t and "n" represents the incremental value of the future time period determined by the financial institution to be the relevant time horizon. "PHOME" represents the pledged value of HOME and "RHOME" represents the required value of HOME.

If both of these conditions are satisfied, the system merely continues to monitor these values and no further action is taken. However, if in the current period the amount of collateral pledged is insufficient, the priority collateralization schedule chosen by the client during the mortgage application process is used to select other assets from the account that must be collateralized in order to correct the imbalance 518. A report is then issued 520 to the mortgage servicing department data file, the account client file, the account master history file and the account manager stating that the account was out of balance. If however, the imbalance cannot be corrected based on the priority collateralization schedule selected, the account compliance routine, which is explained below, is initiated 524.

Figure 11:
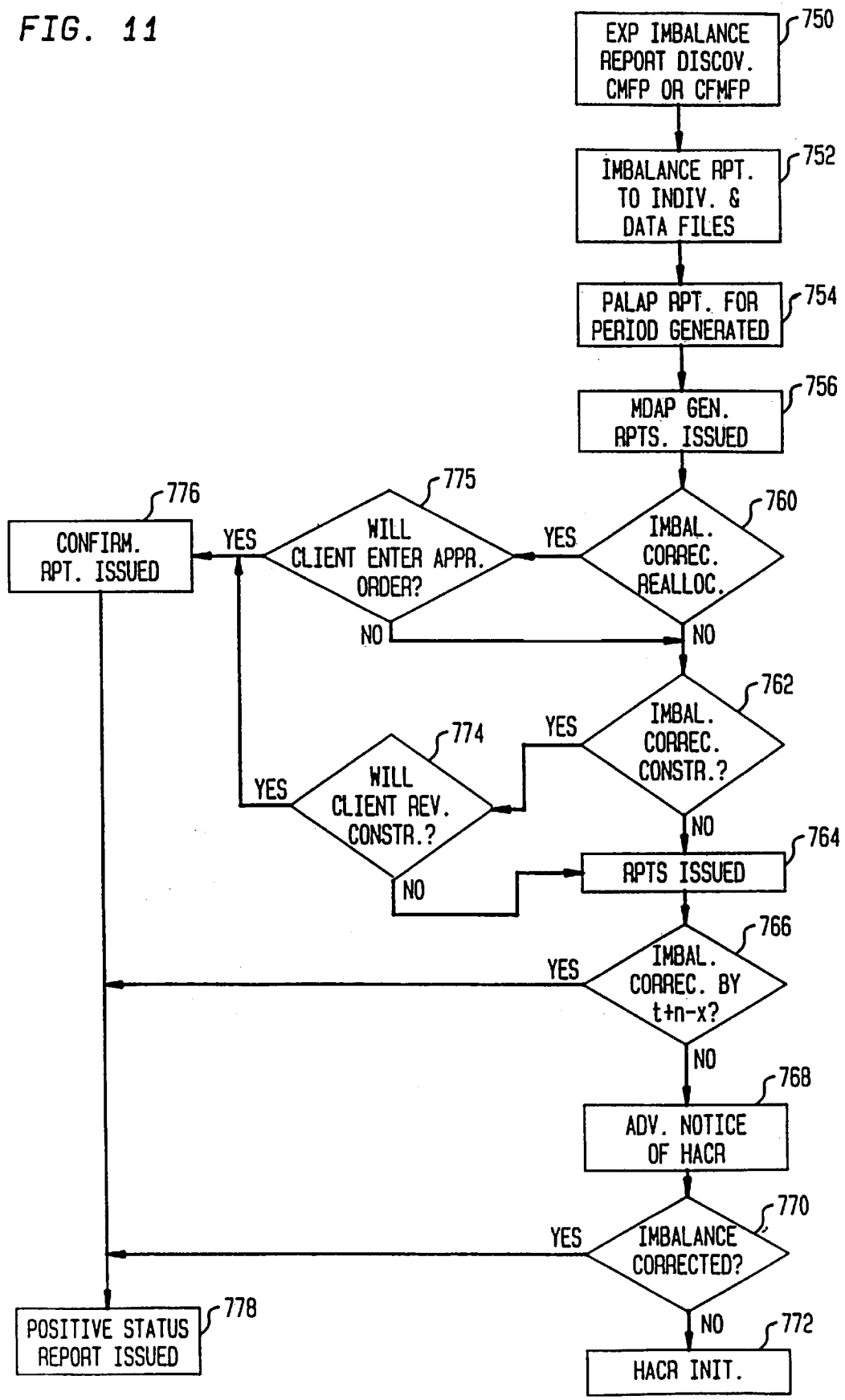
FIG. 11 illustrates an Early Warning Process.

If the expected future value of HOME is less than the amount that is expected to be required in the future, an Early Warning Process (EWP), which is explained subsequently in conjunction with FIG. 11, is initiated 526.

The second form of account supervision and coordination integrated into the HOPE servicing process is the Cash Flow Monitoring and Forecasting Process 527. This process deals with the flows of financial assets and liabilities as opposed to collateral monitoring process which deals with the stocks (quantities) of financial assets and liabilities. Two tests 528, 530 are conducted. First, is any mortgage interest past due and payable and second, is the expected future total return to be received by the HOPE account client given the set of current information greater than or equal to the expected future amount of mortgage interest and amortization payable at time t: $(E(R_{t+n}|\phi t)) \geq (E(MI_{t+n}|\phi t))$. As defined earlier, the variable "t" represents the current time period, "E" is the expected value operator, "$\phi_t$" is the information set assumed to be fully available at time t and "n" represents the incremental value of the future time period determined by the financial institution to be the relevant time horizon. "R" represents the return to be received by the client and "MI" represents the mortgage interest and amortization payable.

If currently no mortgage interest or amortization payments are past due and payable and no shortfalls are expected, the conditions are satisfied and the system continues to perform these tests on a periodic or continual basis.

However, if there are interest or amortization payments past due, the Priority Interest and Borrowing Order (PIBO) previously selected by the client is used to determine how to fund those payments 532. Reports are issued to the client and the account servicing department data file stating the amount past due and period of the deficiency 534. If the required amount plus any penalties are paid 536, the system returns to its monitoring state. If the amount due cannot be fully funded in the manner according to the PIBO selected, the account compliance routine is initiated 538.

If the interest and amortization payments are not past due but the expected future total returns of the client are not greater than or equal to the expected HOPE mortgage, interest and amortization payments 530, the early warning process is initiated 540.

As will be explained later, because of the variety, flexibility and complexity of the account, certain tests are performed to insure that the account and the components within the account meet the minimum requirements specified by the financial institution and regulatory authorities. In particular, the Home Owner's Mortgageable Equity Borrowing Power (HOMEPW) as defined below must be greater than the minimum value of HOMEPW specified by the financial institution (MIM).

It is preferred that these "checks" are done on a continual basis. However, many of the computer systems in a price range affordable by a financial institution cannot manage the processing load imposed by a real time continuous monitoring process for a large number of accounts. The frequency of the checks may be limited to when a transaction request or order is initiated and/or on a periodic basis. As will be illustrated, if the value or status of any component of the HOPE account changes, so do the account balances, inter-component relationships, and future financial projections of the account. Thus, before an order is executed, a "what if" analysis is performed wherein the HOPE account components are changed to reflect the proposed transaction and account balances and ratios are checked against the required minimums as dictated by the financial institution and regulatory authorities. If the account, taking into consideration the proposed transaction, meets all minimum requirements, the order is executed and the account is updated to reflect the transaction. If the account does not meet the minimum requirements the client is contacted and either the order or some other account component(s) is modified or the transaction order is cancelled such that the minimum requirements of the account are maintained.

In addition to performing "checks" prior to the execution of a transaction order, these checks are performed periodically to reflect any changes in the account components not related to a transaction, such as a change in the value of an asset or liability. Although the frequency of the check is chosen by the financial institution, the character of the account is an indicator as to how frequent the "checks" should be done. If the account is considered "inactive", i.e. the account has very few transactions and is composed of assets with stable values, the account may only be checked prior to issuing a monthly statement to the client. However, if the client has a portion of his capital in an asset such as commodities futures or options, the value of those assets will change as the price of the commodity or option changes. Therefore the status of the account will be checked more frequently if there is volatility in the value of the account components.

Processing of Transaction Order

Figure 8A:
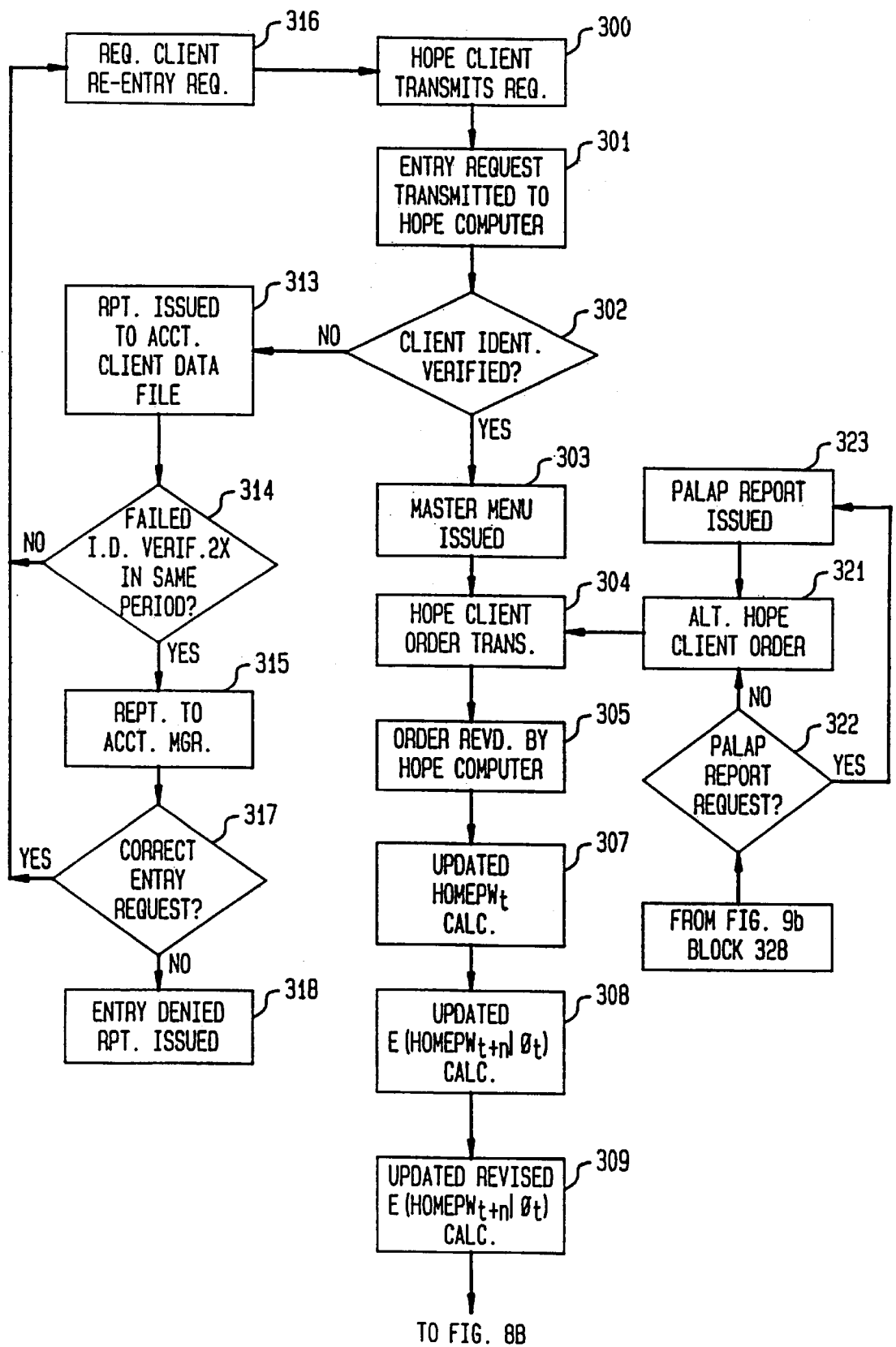
FIGS. 8a, 8b, 8c illustrate a process to effect a client's transaction request in a HOPE account.
Figure 8B:
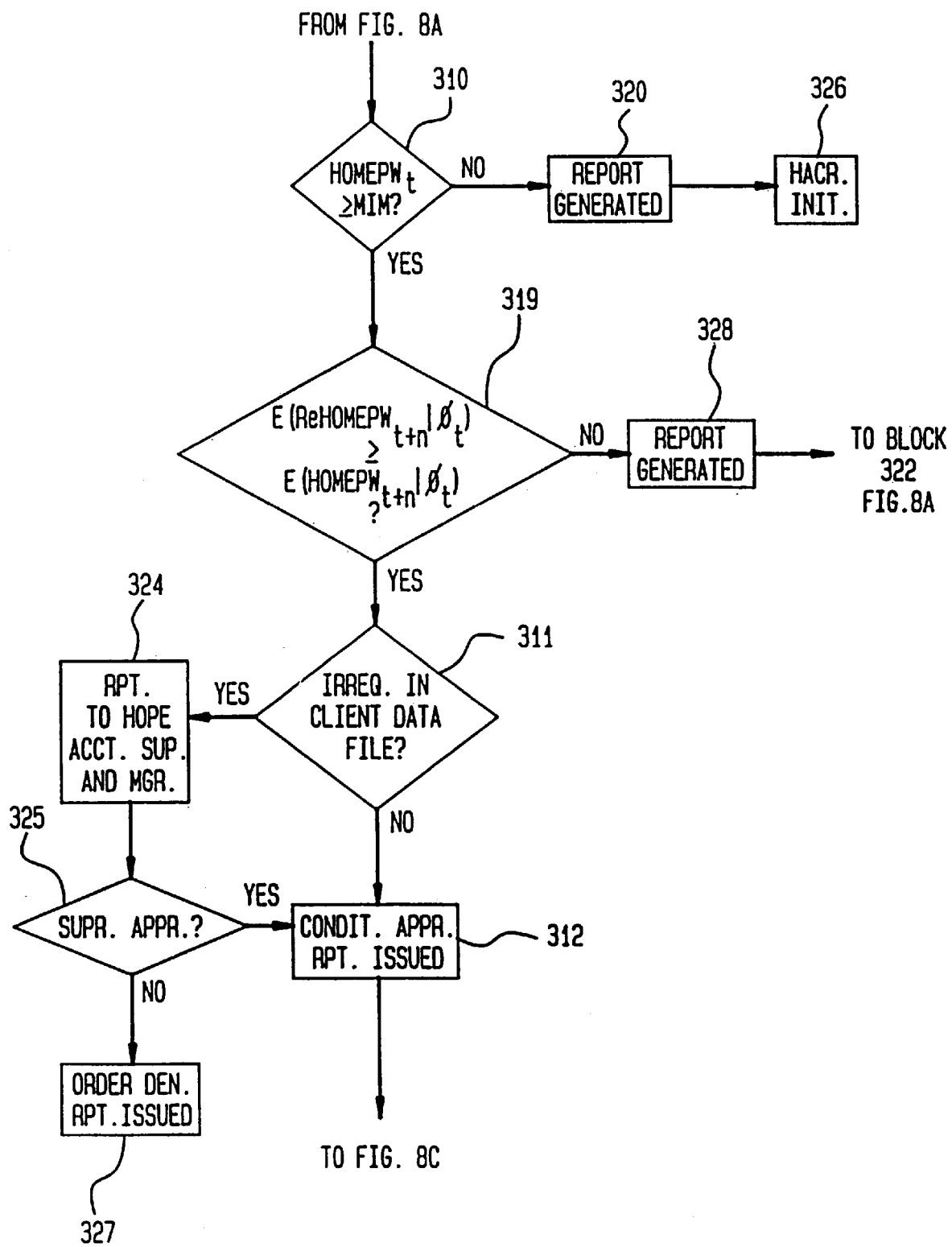
Figure 8C:
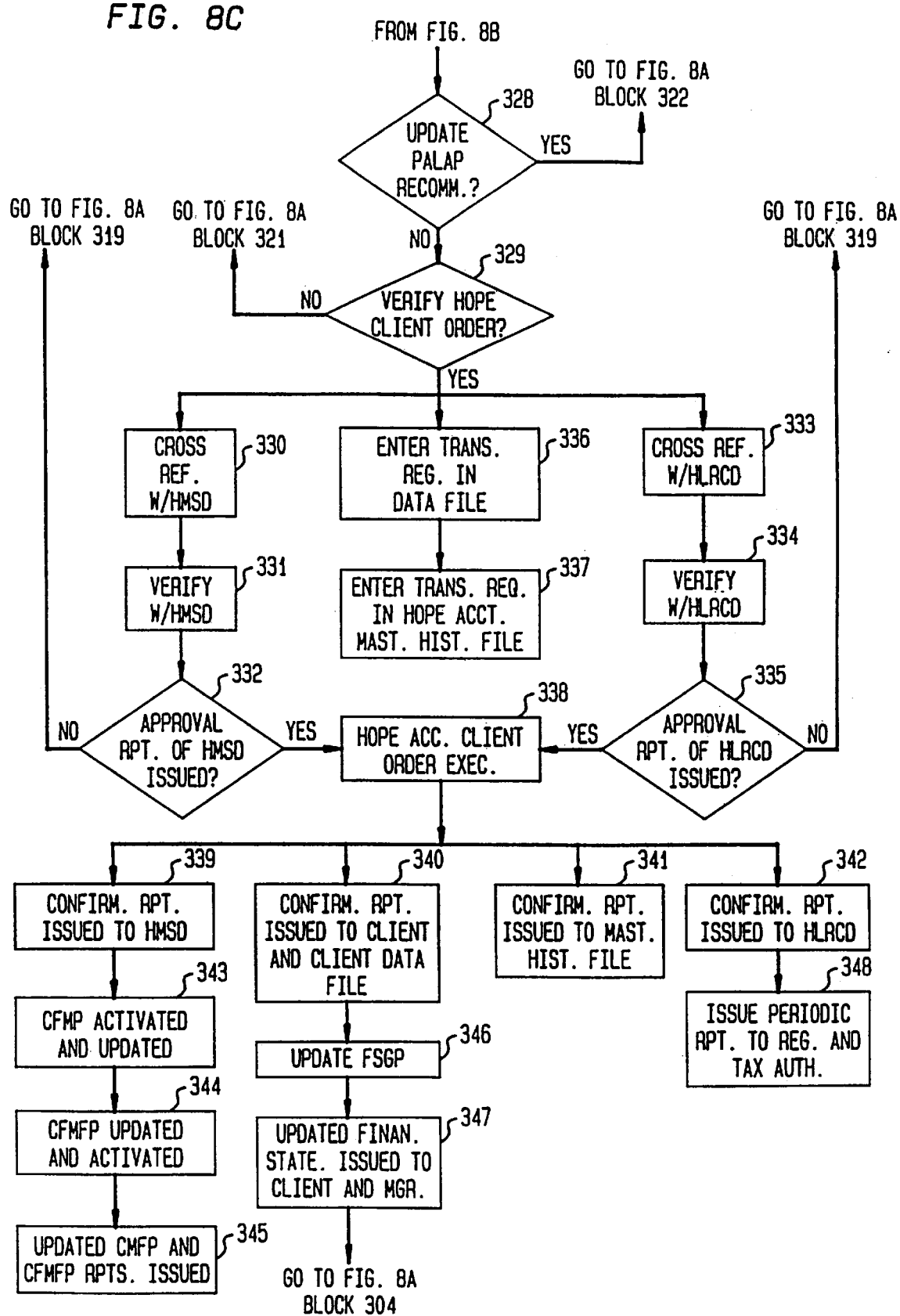

FIGS. 8a, 8b, 8c illustrate the process to effect a client's transaction order. The client first transmits a request to be allowed access to the system 300. This request may be made through a variety of means. For example, the client may telephone his broker or directly access the system through a computer terminal. The access request would in turn be transmitted to the HOPE central computer system 301. Before the client's request is processed, the central computer must verify the client's identity 302 by any one of the identification techniques known to those skilled in the art. For example, the client's identity may be verified by entry of the client's secret identification number. In the event that the client identity is not verified, a report is issued to the HOPE account client file 313, and the file is cross referenced to determine whether there have been more than two failures to verify the client's identity within a predetermined time period. If that is not the case, the individual is permitted another attempt to verify the client's identity. If there have been two or more failed verification attempts within the predetermined time period, a report is issued to the account manager 315. The account manager examines the report and tries to correct the problem 317, typically through communication with the client. If the problem is solved, the client is requested to reenter his request 316. If the problem is not solved, the request is denied and a report is issued denying the purported client access to the system 318.

If the client's identity is verified, the HOPE master menu is presented to the client for his review and selection of the transaction desired 303. The client transmits the transaction order to the HOPE master central computer 304, where the order is received and processed 305.

Before the transaction order is processed, however, the order must be approved. The system determines whether the transaction will affect the account balances such that the account status is outside the limits specified by the financial institution and the regulatory authorities. First the central computer must calculate the updated values of the Home Owner's Mortgageable Equity Borrowing Power at the present time t ($HOMEPW_t$) 307, an updated forecast of the client's expected HOMEPW throughout the future given current information and the client's current and expected future asset/liability configuration ($E(HOMEPW_{t+n}|\phi_t)$) 308; and an updated revised expected HOMEPW throughout the future given current information ($E(ReHOMEPW_{t+n}|\phi_t)$) based upon the client's requested transaction 309. The variables "t", "E", "n" and "$\phi_t$" are as previously defined and "Re" represents that the variable is revised based on a potential transaction.

Once these variables have been calculated, the central computer determines whether $HOMEPW_t$ is greater than the Management Imposed Minimum HOMEPW (MIM) and whether the revised estimated future HOME Borrowing Power (Revised $E(HOMEPW_{t+n}|\phi_t)$ is greater than what the HOME Borrowing Power would be if the transaction is not entered into ($E(HOMEPW_t|\phi_t)$).

Referring to FIG. 8b, if $HOMEPW_t$ is below the MIM, a report is issued to the client and the account manager 320 and the account compliance routine is initiated 326. If $HOMEPW_t$ is equal to or above the MIM, $E(ReHOMEPW_{t+n}|\phi_t)$ is then compared to $E(HOMEPW_{t+n}|\phi_t)$ 319. If the revised expected future HOME Borrowing Power is less than the expected future HOME Borrowing Power, a report is issued to the client and account manager 328 and the client is given the choice of entering an alternate order that will increase the expected future HOME Borrowing Power 321 or requesting that PALAP be initiated 322 to generate a report 323 recommending reallocation of assets and liabilities for the current and/or future periods in order to increase future HOME Borrowing Power such that the revised expected future HOME Borrowing Power is greater than or equal to the expected future HOME Borrowing Power. The client may then select one or more of these recommendations to be transmitted to the system as an order request 321 to increase the future HOME Borrowing Power, although a client will not be prohibited from entering an order provided that the revised expected $HOMEPW_{t+n}$ is greater than the expected MIM that is forecast to exist at time t+n.

If $HOMEPW_t \geq MIM$ and $E(ReHOMEPW_{t+n}|\phi_t) \geq E(HOMEPW_{t+n}|\phi_t)$, the transaction request or order is cross referenced with the client history data file to ensure there are no past irregularities concerning the client's account 311 such as an excessive number of large cash transfers, repeated overdrafts, or past due interest payable. If no irregularities are found in the client's account history, the client is issued a conditional approval report 312. A copy of that same report is also issued to the account manager.

If irregularities surface, a report is immediately issued to the account supervisor and the account manager 324. The account supervisor reviews the report 325 and determines whether to deny the order 327 or to approve it despite the past irregularities. If the supervisor approves the order, a conditional approval report 312 is issued to the client and the account manager. The account supervisor may also take other action such as recommending that the client consider other transaction order alternatives or make an alternate order. If the supervisor denies the order, a report is issued to the client, master history data file and account manager.

Referring to FIG. 8c, the client is asked whether he desires to have PALAP rerun so that he may better understand how to reallocate his assets and liabilities or to update his financial plan and/or optimize the net return from his investment and borrowing transactions 328. If the client does not desire another PALAP recommendation, the account transaction order is verified by the client 329 and the mortgage servicing department and the legal and regulatory compliance departments are notified of the order. The transaction order data is entered in the client data file 336 and the account master history file 337. If the order is not verified by the HOPE account client because of incorrect data transmission or other causes, the system returns to the process sequence depicted at 321 which permits the client to modify the order.

The mortgage servicing department, upon receiving notification of the order, cross references the order with its mortgage account files 330, verifies the effect of the proposed transaction 331, and either approves or disapproves the order 332. Similarly, the legal and regulatory compliance department cross references the proposed transaction order with legal and regulatory guidelines 333 to verify the effect of the proposed transaction on applicable statutes 334 and issues an approval or rejection 335.

If the order is approved by both departments, the transaction order is executed 338 and copies of confirmation reports are issued to the mortgage servicing department 339, the legal and regulatory compliance department 324, the client and client data file 340 and the master history data file 341.

Upon receipt of the confirmation report by the mortgage servicing department, the collateral and the cash flow monitoring and forecasting processes are activated 343, 344. Both the collateral and cash flow monitoring processes are discussed in detail later in this specification. Reports reflecting the updated collateral and cash flow values are issued to the client data file, the account master history file and the legal regulatory and compliance file 345.

The legal and regulatory compliance department stores the confirmation order for use in generating periodic reports to the appropriate legal, regulatory and tax authorities as required by applicable law or regulatory statute 348.

Once the client's data file has received confirmation of the executed order 340, the client's financial statements (balance sheet, profit and loss statement, sources and uses of funds statement and actual vs. budgeted income and expense statement) are updated 346. Updated financial statements and confirmations are issued to both the client and the account manager 347.

Calculation of HOMEPW

Figure 9:
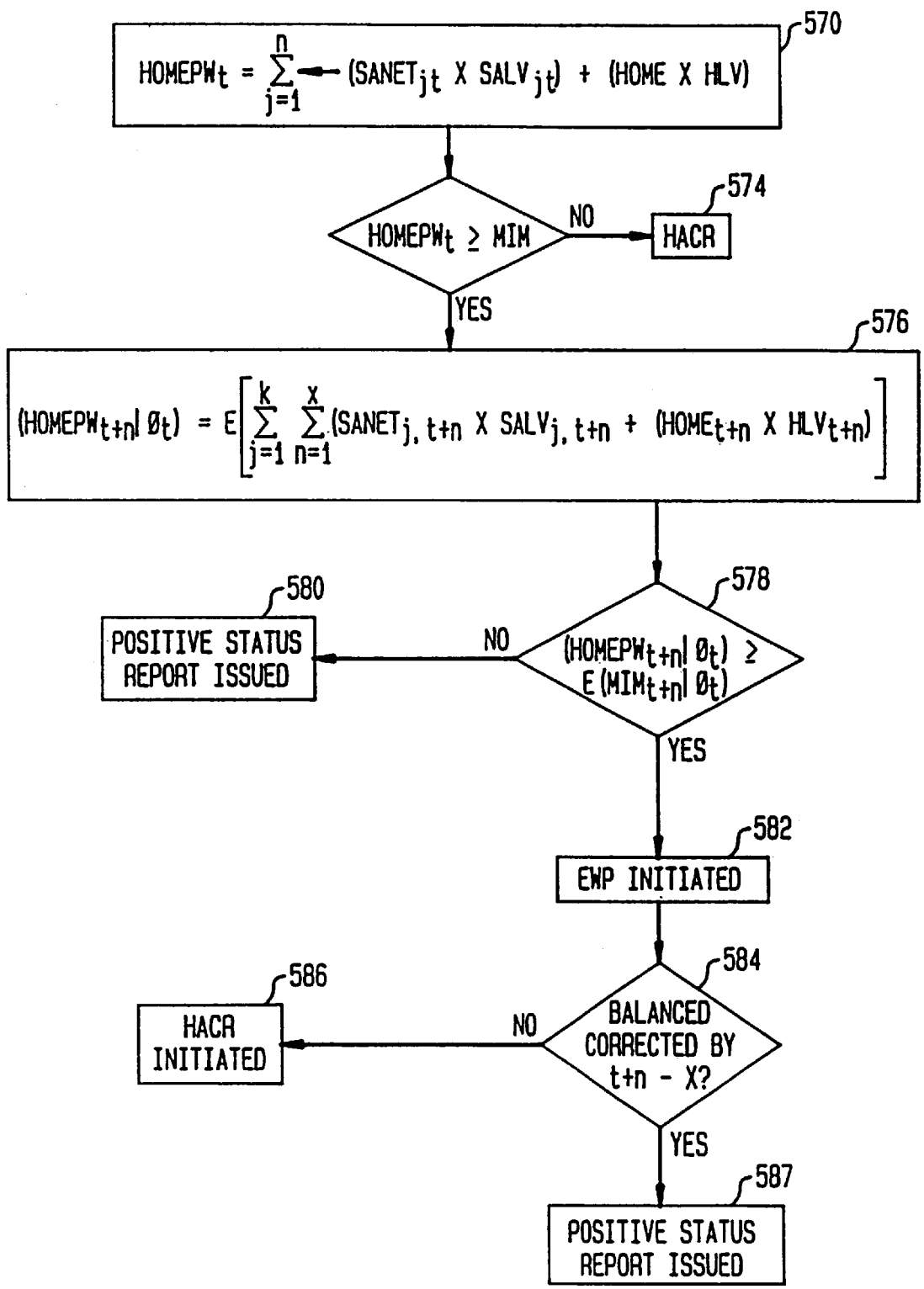
FIG. 9 illustrates a process for updating and verifying the Home Owner's Mortgageable Equity (HOME) Borrowing Power.

As stated earlier, the levels of transaction activity and price volatility of the account indicates how often an account is updated. The client's account is checked by updating and verifying the present and future Home Owner's Mortgageable Equity Borrowing Power (HOMEPW). FIG. 9 depicts the process for updating and verifying the HOMEPW at time t (HOMEPW$_t$) and the expected future value of HOMEPW$_t$ given the amount of information currently available at time t (E(HOMEPW$_{t+n}|\phi_t$)).

HOMEPW$_t$ is equal to the sum of each sub-account asset loan value which is the net asset value or Net Equity Total of each sub-account (SANET$_j$) multiplied respectively by the sub-account Loan to Value Ratio (SALV$_{jt}$) added to the product of the assessed value of the client's Home and the home Loan to Value Ratio (HLV) 570. The variables "t", "n", "$\phi_t$," and "E" are as previously defined and the variable j represents the subaccount number for each type of asset or liability sub-account possessed by the client.

Once HOMEPW$_t$ has been calculated, it is compared to the minimum HOMEPW$_t$ specified by the financial institution (MIM) 572. This figure will vary depending upon the overall size of the account, its level of activity and the credit record of the individual HOPE account client. If the HOMEPW$_t$ is not greater than or equal to MIM, then the account compliance routine is initiated 574.

In the event that the balance is corrected during execution of the account compliance routine or that HOMEPW$_t$ is in excess of or equal to MIM, the expected future HOMEPW based on the set of information available at time t is calculated 576. E (HOMEPW$_{t+n}|\phi_t$) is equal to the product of the expected future value of the product of all sub-accounts' Net Equity Total (NET) and their respective expected future loan to value ratios added to the product of the expected future value of the home(s) owned by the HOPE account client and the expected future loan to value ratio of the home(s). The time period under consideration will vary from t+1 (i.e., the next period) through t+n.

After the expected future value of HOMEPW$_t$ is calculated, the value is compared to the expected future MIM value 578 based on the current set of information available (E(MIM$_{t+n}|\phi$t)). It is possible that MIM may be forecast to vary over time as management may elect to either strengthen their credit standards or reduce their credit restrictions on HOPE account clients based on past performance or anticipated market conditions. If the expected future HOMEPW$_t$ is greater than or equal to the expected future MIM, a positive status report is issued 580 indicating that the account is in good standing. In the event that the expected HOMEPW$_t$ is not adequate, the early warning process is initiated 582 to notify the financial institution and the client of the possible future imbalance. Unless the balance is corrected within a time frame deemed appropriate by management 584, e.g. the time period immediately prior to the time period in which a deficiency is forecast to exist, the account compliance routine is initiated 586. If the balance is corrected within the appropriate time frame, a positive status report is issued 587.

Management may require that assets and liabilities be immediately reallocated upon detection of a forecast future imbalance. In most instances, however, this will not be necessary unless the forecast imbalance is substantial.

Priority Asset and Liability Allocation Process (PALAP)

Figure 10A:
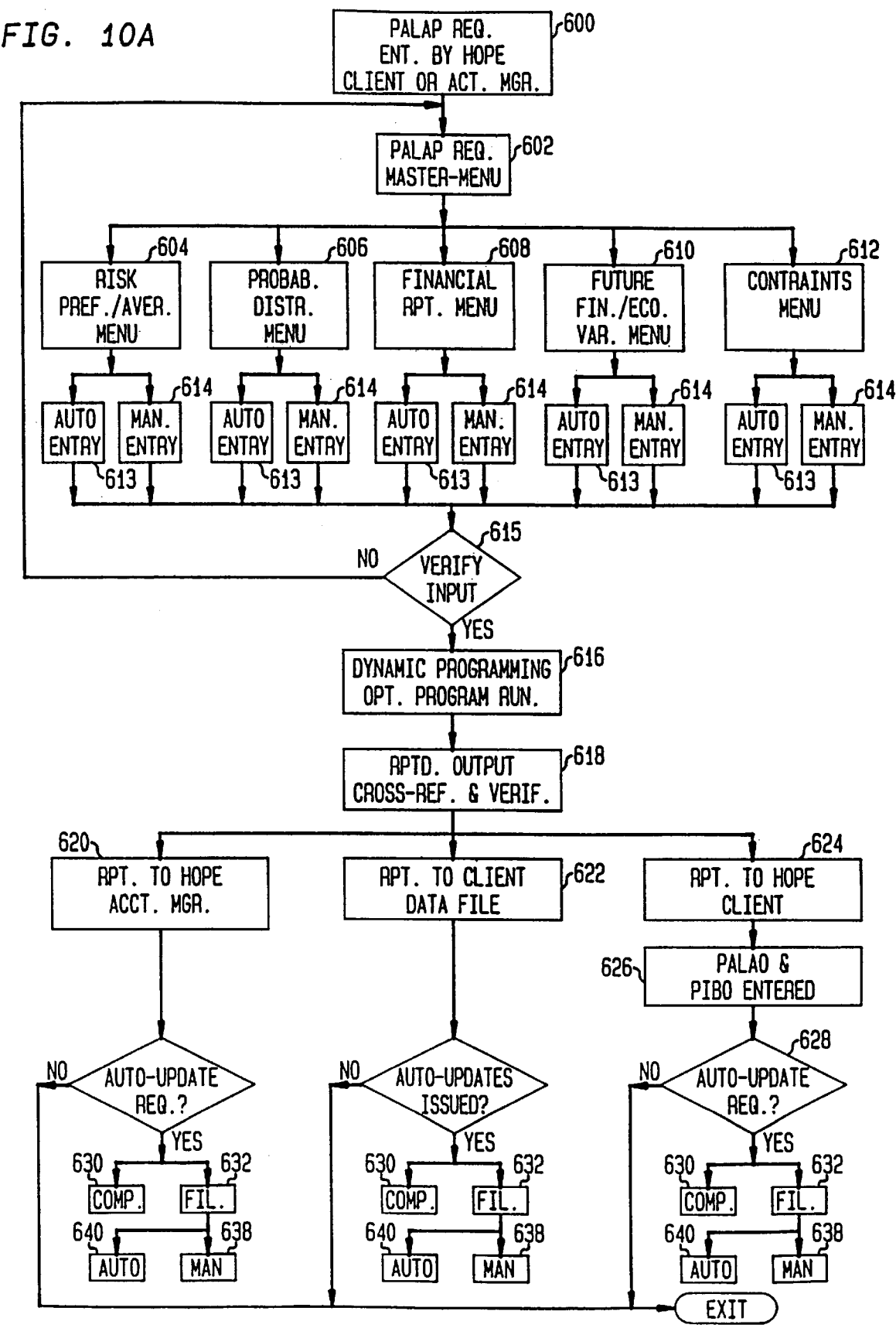
FIGS. 10a and 10b illustrate a Priority Asset and Liability Allocation Process.

FIG. 10 depicts the Priority Asset and Liability, Allocation Process (PALAP). Through a personal financial planning model utilizing mathematical programming of which, dynamic programming is a specific type of mathematical programming used in the preferred embodiment, PALAP establishes an optimal system of priorities for the allocation of the stocks (quantities) and flows of financial assets and liabilities. PALAP generates the Priority Asset and Liability Allocation Order (PALAO) and the Priority Investment and Borrowing Order (PIBO) for the client's account. PALAO and PIBO are of great value to the HOPE account client because they show the client the optimal allocation of assets, liabilities, net cash flows and net borrowing requirements over a defined period of time ranked in a prioritized order. PALAO and PIBO are guidelines through which the financial institution can supervise and regulate the actions of a multiplicity of clients who potentially have an infinite number of investment opportunities available to them and by which the financial institution is provided a defined means of satisfying MIM in the event that there is an imbalance in the account. PALAO regulates the stock (quantity) level of asset and liability holdings, while the PIBO regulates the flow of cash into and from assets and liabilities. By executing PALAP, the system generates a preferred allocation of assets and liabilities comprising a PALAO and PIBO based on system default variables and a client directed allocation of assets and liabilities comprising a PALAO and PIBO based on variables specified by the client.

The priority asset and liability allocation process is initiated 600 when a client applies to open a HOPE account or applies for a Hope mortgage. However, the system may also be activated at any other time at the client's, the account manager's or the account supervisor's request. When the process is initiated, the central computer issues a PALAP master menu to the account client 602. The master menu contains five options for the selection of sub-menus: an investment risk preference/risk aversion menu 604, a probability distribution menu 606, a financial report menu 608, forecasted future economic variables menu 610, and a constraints menu 612. The client selects the menus one at a time so that the information contained therein may be added to or modified.

The investment risk preference/risk aversion menu 604 contains information regarding the degree of risk the client is willing to accept with his investments and borrowing. For example, the client may be willing to accept substantial risks by investing in the commodities futures market or by borrowing heavily. The probability distribution menu 606 contains information regarding the level of certainty and/or uncertainty regarding future events. The financial report menu 608 includes information concerning a client's current balance sheet, income statement and sources and uses of funds. The future economic variables menu 610 contains information concerning predicted future values of economic variables used in financial calculations such as the future HOME borrowing power. The menu of financial and budgetary constraints 612 contains information and account restrictions which may be specified by the client, by the financial institution or by regulatory authorities.

Each of the menus can be completed by either automatic entry means 613 (default mode) or by manual entry means 614. For example, if a client does not wish to complete the risk preference/aversion menu 604, he may simply specify certain personal financial data that may be automatically inputted by the system from data generated for existing HOPE clients; and assumptions concerning risk preference/aversion will be automatically entered as the appropriate answers of the menu. Likewise, the probability/distribution menu 606 may be completed automatically through default variables by assuming a normal distribution of the forecast financial variables. The financial report 608 may be completed automatically for clients already having a HOPE account by using the balance sheet, sources and uses of funds and income statements in the client's data file. Information concerning future income and expense items are also contained within the client data file, particularly information related to future salary income and yields on securities held within the HOPE account. The forecast of future financial and economic variables 610 utilized by the financial institution can be entered automatically by incorporating an economic forecast derived from published governmental forecasts or from internal economic reports generated by the financial institution. The menu of constraints 612 may automatically incorporate a default set of constraints stored in the central computer. However, budgetary and other financial constraints are typically subject to individual preference; and usually a client will choose to manually input this information.

After all of the menus have been completed or modified, the input is verified by the client 615. If there is an error in input, the process returns to the master menu 602, through which the client may choose to alter various menu items. After the menus have been verified, a dynamic programming optimization algorithm is executed to generate a series of reports 616 which present the optimum combination of asset and liability holdings given a set of constraints and a defined time horizon to best realize the client's financial objectives. Mathematical programming is a process developed in the field of operational research which performs constrained optimization, i.e. the process endeavors to find an optimal solution to a problem where constraints are defined as limits. Although any of the several varieties of mathematical programming may be used in connection with the invention, the nature of financial markets and the behavior of individuals seeking to maximize their returns in financial markets is dynamic, that is, the solution generated to personal financial planning problems should take into consideration the change in variables over time as well as the rate of change of variables over time. Accordingly, dynamic programming is recommended as the type of mathematical programming to be used in the preferred embodiment of the invention. The entries specified through the constraint menu 612 present a set of constraints that must be considered in generating the optimum financial solution for the client. Thus, the PALAO and PIBO generated through this process are the optimum financial solution to maximize the client's financial objectives specified through the menus.

The reported output is then cross referenced to the client account files and verified 618. Reports are then issued to the account manager 620, client account data file 622 and the client 624. The reports include a HOPE account client balance sheet over a defined period of time, a sources and uses of funds statement for the designated time period, an income, profit and loss statement for the time period considered, and a recommended PALAO and PIBO.

After the reports have been issued, the HOPE account client will be requested to accept or modify the suggested PALAO and PIBO 626. An automatic update of these reports may be requested 628 either in full presentation form 630 or alternatively, in a filtered form 632 which highlights only the modified variables. The filtered variables may be manually selected 638 or automatically selected according to a system default set of variables 640. For example, a client may only be interested in receiving an updated report if a change in an economic variable is going to affect his retirement income or a client may be indifferent to changes in economic variables that insignificantly effect his portfolio holdings.

After the reports are issued, the client and the account manager have the option to run PALAP again by repeating the process starting at the step represented by block 600.

For example, the client may prefer to select a real-time updated version of PALAO and PIBO based upon a PALAP updated with respect to changes in key financial variables such as changes in interest rates on borrowing costs, dividend yields on common stock prices, and returns offered on various types of annuities.

Figure 10B:
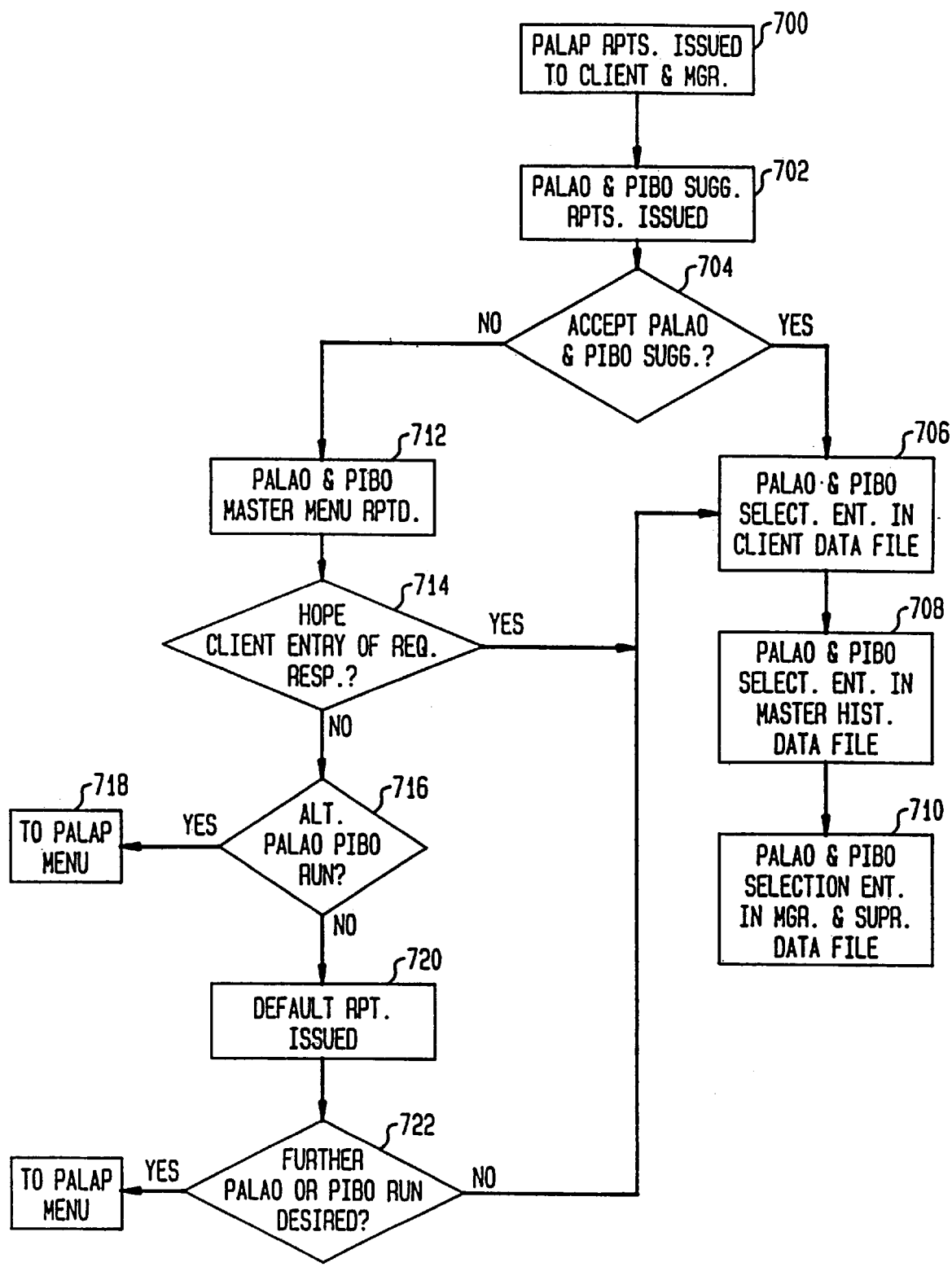

Referring to FIG. 10b, if the HOPE account client selects the recommended PALAO and PIBO, a record of this is entered into his client file 706, the account history file 708, and the mortgage servicing department master file 710. If the client chooses not to follow the system's recommendations, the client is given the opportunity to designate a PIBO and PALAO 712. Once the HOPE account client completes the master menu 714, his selections are entered in the system files as represented in blocks 706, 708 and 710.

If the client rejects the automatically generated PALAO and PIBO and he does not designate a PALAO and PIBO, the client is offered the opportunity to generate alternate PALAOs and PIBOs 716. If the client desires an alternate PIBO and PALAO, the process returns to the PALAP main menu where the client is given the option to change his responses to the PALAP menu previously completed 718. If the client does not want to change what was previously specified or he does not desire to specify an alternate PALAO and PIBO, then he is notified 720 that the PALAO and PIBO first recommended to him will be applied automatically to his account and will be used for allocating his future net cash flows and borrowing requirements. After the report is issued, the client is offered another opportunity to designate an alternate PALAO and PIBO and rerun PALAP 722. If the client does not desire to run PALAP again, the system recommended PALAO and PIBO and the default PALAP is entered and reported to the appropriate data files represented in blocks 706, 708 and 710.

Early Warning Process

Referring to FIG. 11, the Early Warning Process (EWP) alerts both the internal management of the financial institution and the client of expected future imbalances that are forecast to occur. If at 750 the system reports a future imbalance expected at time t+n, notice of the expected imbalance is immediately reported to the client, the account manager and the mortgage servicing department 752. Financial reports are issued to the HOPE account client and the HOPE account manager concerning the relevant time period of the imbalance 754 and PALAP is run in order to generate a current PALAO and PIBO having potential solutions to the imbalance 756.

The financial reports generated by PALAP are then sent to the client and the account manager. The financial report will indicate if the imbalance can be corrected by the reallocation of assets and liabilities among different accounts or subaccounts either prior to or at the time of the anticipated imbalance 760. If the reallocation of assets and liabilities is not sufficient to correct the anticipated future imbalance, the system will indicate whether or not modification of some of the specified constraints on the system (e.g. desired levels of consumption spending) will be sufficient to correct the imbalance and if so, what specific changes to the constraints should be made 762.

If the imbalance cannot be corrected or if the client will not agree to take the appropriate action suggested 774, 775, a report is issued to the account supervisor, the account manager, the mortgage servicing department and the client 764. If the imbalance is forecast to exist at time t+n, and if at 766 the imbalance has not been corrected by the time t+(n−x), where x is a value defined by the financial institution to be equal to the number of time periods prior to the anticipated occurrence of the imbalance by which time the imbalance must be corrected, an advance notice of the implementation of the HOPE Account Compliance Routine (HACR) 768, is issued to the client, the account manager, the account supervisor and the mortgage servicing department. If after notice the imbalance is still not corrected 770, then the account compliance routine is initiated 772.

Even if a client may not reallocate his assets or liabilities or modify the constraints on the PALAP, it is still possible that the forecasted imbalance will not occur at time t+(n−x) since, for example, the returns on the client's stock portfolio may be greater than expected or the client may contribute additional assets to his HOPE account at some time prior to the date of the anticipated balance.

If the forecasted imbalance does not occur or if the client revises his constraints and/or reallocates his assets and liabilities to avoid the imbalance, confirmation reports are issued 776 indicating the change in status and a positive status report is issued 778 to all those parties previously notified of the imbalance.

HOPE Account Compliance Routine

Figure 12:
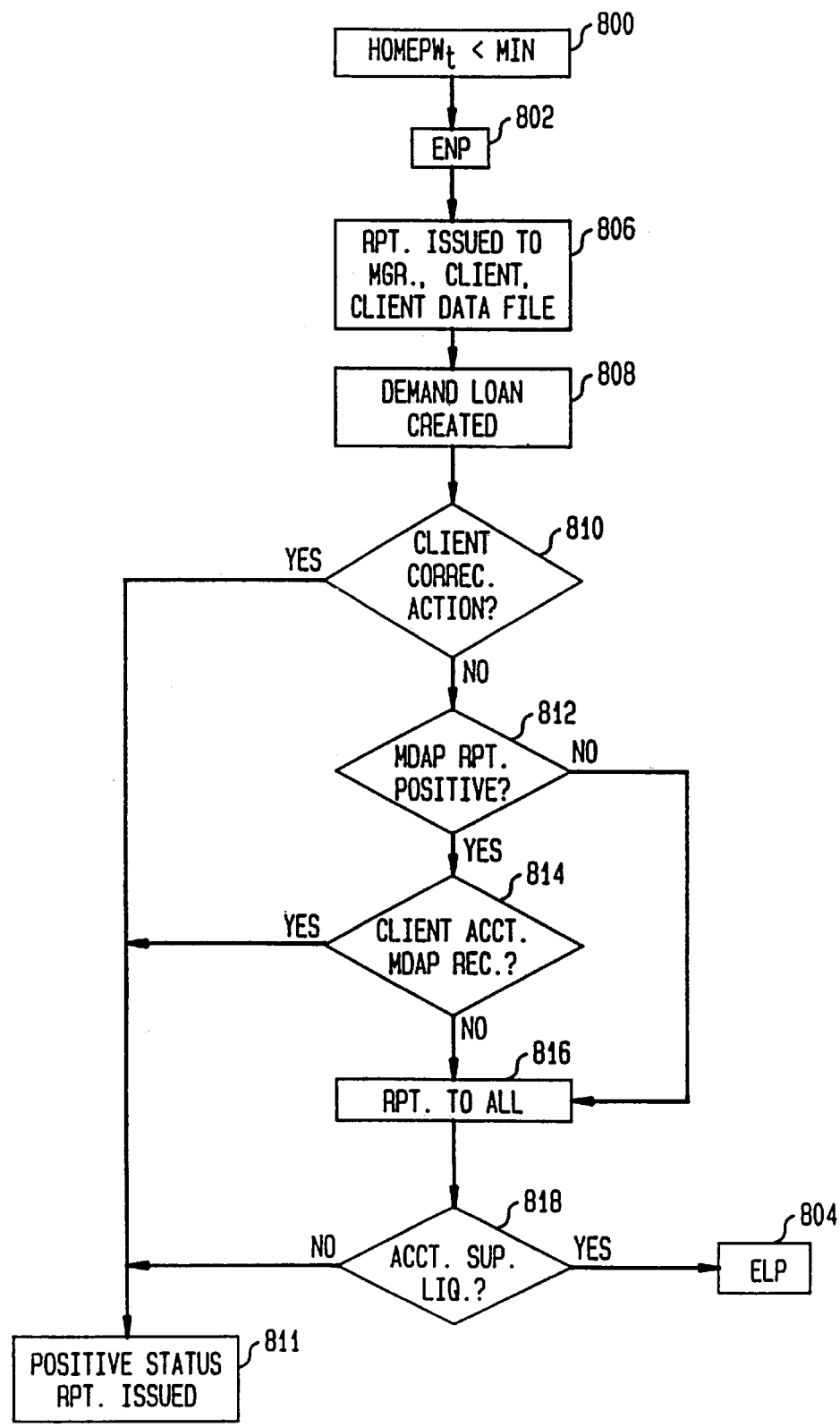
FIG. 12 illustrates a HOPE Account Compliance Routine.

FIG. 12 illustrates the HOPE Account Compliance Routine (HACR) which includes the Emergency Notification Procedure (ENP). If an account imbalance occurs wherein HOMEPW$_t$ is less than MIM 800, ENP 802 is initiated to notify the client and the financial institution of the account imbalance. Unless the account imbalance is corrected, the Emergency Liquidation Procedure (ELP) is ultimately activated 804.

When an imbalance is determined, i.e. when HOMEPW$_t$ MIM, ENP 802 is initiated and reports citing the imbalance are issued to the account supervisor, the account manager, the client, the client data file, the mortgage servicing department data file and the account history file 806. Simultaneously, a demand loan is created 808 secured by the general obligation of the client and the totality of assets in the account and bearing a previously agreed interest rate. The loan will continue to exist until the imbalance cited is corrected and all interest charges are paid in full.

Once the appropriate authorities are apprised of the imbalance and the secured loan is created, one of several events may occur. First, the client may direct that specific corrective action be taken that resolves the account imbalance 810. If the client suggests a corrective action, the system will modify the account to comply with the client's suggestions and if the imbalance is corrected the system will issue a positive status report 811.

If the client does not direct that corrective action be taken, a system recommendation report comprising a PALAO and PIBO is generated using the system default variables instead of any variables input by the client. The principal objective of such a report is to provide the optimum method to satisfy MIM which is achieved when system default variables are used. Provided that corrective action can be recommended that satisfies MIM, the system will then consider and endeavor to maximize the client directed objectives subject to client specified constraints.

If a positive recommendation for corrective action is presented, the client is offered the opportunity to either accept or reject the system recommendations 814. If the client accepts the system recommendations, the account is modified to comply with the recommendations and a positive status report is issued 811. If the client does not accept the system recommendations, a report noting this fact is issued to the parties and data files referred to previously 816. Upon receipt of the report, the account supervisor determines whether to initiate the emergency liquidation procedure 804 or to consult with the client in the hope of encouraging him to either accept the system recommendations or take further action on his own behalf to correct the imbalance 818.

If positive recommendations that completely resolve the imbalance cannot be issued, a report is issued to the parties and data files referred to previously 816 and the account supervisor is given the choice of activating the emergency liquidation procedure or working with the client to correct the imbalance. The likely result is that the account supervisor will be compelled to immediately activate the liquidation procedure 804 since no reformulation of the asset and liability configuration is capable of bringing HOMEPW$_t$ within specified constraints. At this point, the assets will have to be liquidated, loans repaid on a priority basis and further collection actions taken to collect the deficiency.

Emergency Liquidation Procedure

Figure 13:
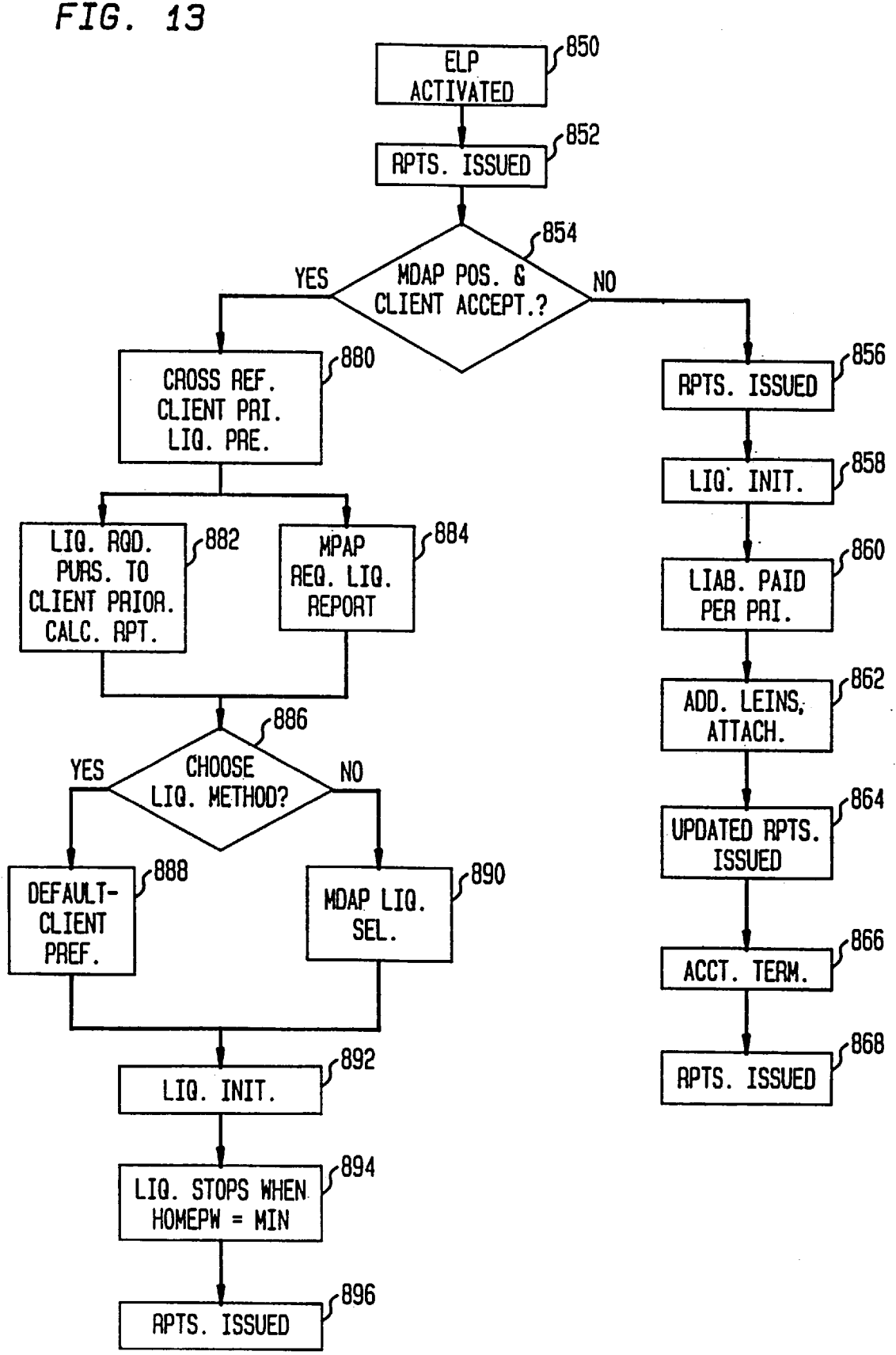
FIG. 13 illustrates an Emergency Liquidation Procedure.

FIG. 13 illustrates the Emergency Liquidation Procedure (ELP). ELP is initiated when the assets in the account are no longer sufficient to meet the financial institution's minimum standards (MIM). When ELP is initiated 850, reports are immediately issued 852 to the client, the account supervisor, the legal and regulatory compliance department, and the corresponding data files. These reports detail the fact that the HOPE account is about to be liquidated because of an imbalance in the account and violation of the HOPE account borrowing agreements.

It is then determined if the system report previously issued for the account and filed in the client data file is positive or negative 854. In the event that it is negative, no potential configuration of the asset and liability holdings of the account is sufficient to satisfy MIM, and a report is issued 856 indicating that a complete liquidation is about to be commenced. The account's assets are then liquidated 858. As assets are liquidated, liabilities are repaid on a priority basis 860 previously established by the financial institution taking into account such factors as the loan-to-value ratio and the liquidity of the asset. To the extent all liabilities cannot be satisfied through the liquidation of assets or asset accounts, liens are established on the client's other assets 862. Periodic update reports are issued to the parties and data files referenced above to advise them of the progress in the liquidation and termination of the account 864. When all of the liabilities have been satisfied, the account is terminated 866.

If the system report is positive and the client is willing to accept the recommendations presented or to make alternative recommendations as to how the account should be liquidated in order to satisfy MIM, then the client priority asset/liability liquidation preference is cross referenced 880. This information was input to the client data file when the account was opened and PALAP initiated.

Two reports are then prepared to be presented to the parties and the pertinent data files 882, 884. The first report is a calculation of the required liquidation pursuant to the client's previously established liquidation preference 882 and the second is the system liquidation report 884. The client is then asked to indicate within a limited time period 886 which liquidation schedule is preferred. If he does not select the system liquidation schedule within the time limit, the HOPE account will be liquidated pursuant to the client's previously established priority liquidation schedule 888.

Once the liquidation method is selected, the liquidation procedure is initiated 892. The liquidation will only proceed to such a point as the HOMEPW is equal to MIM. At that point, the liquidation will terminate and the account will be maintained 894. At that point, the financial institution's report is issued to the client, the manager, the supervisor, the mortgage servicing department and the legal and regulatory department, the client file and the master history file indicating what liquidation transactions took place and the final result of those transactions 896.

While the invention has been described in conjunction with specific embodiments, it is evident that without departing from the scope of the present invention numerous alternatives, modifications, variations and uses will be apparent to those skilled in the art in light of the foregoing description.

I claim:

1. A computer system operating at least one client account at an institution providing financial services or financial processing comprising:

processing means;

memory means connected to said processing means for storing information pertaining to the client accounts(s);

means for maintaining on said computer system data for said client account(s), each of said client accounts comprising at least one asset account having means for receiving funds for investment purposes, said asset account further having means for updating an account balance upon receipt of said funds and at least one liability account including a loan, a condition of which is the periodic payment of a sum of money equal to or in excess of interest charged on the loan;

means for establishing a priority for the allocation of funds to said investment asset account(s) and said liability account(s);

means for using said computer system to allocate funds that are received to pay interest on the loan, and allocate any remaining portion of said payments to one or more of said investment asset account(s) and said liability account(s) other than the loan according to said priority; and updating the prioritized allocation in accordance with changes to financial and economic variables.

2. The system of claim 1 wherein the payments are made on a fixed payment schedule.

3. The system of claim 1 wherein the payments are made on a variable payment schedule.

4. The system of claim 1 wherein said funds further comprise cash flows generated by said investment asset accounts.

5. The system of claim 4 wherein one such liability account is a loan secured by the lien on at least one home and one or more of said investment asset accounts, said system further comprising means for using said computer system to allocate funds received from the cash flows to one or more of said investment asset account(s) and said liability account(s) rather than amortizing the loan.

6. The system of claim 4 further comprising means for using said computer system to allocate generated cash flows from said investment asset accounts into at least one predetermined investment asset account or liability account.

7. The system of claim 6 wherein said predetermined account is chosen by the client.

8. The system of claim 6 wherein said predetermined account is chosen by the institution.

9. The system of claim 1 wherein one such liability account is a loan secured by the lien on at least one home and one or more of said investment asset account(s), said system further comprising means for using said computer system to allocate the remaining portion of said funds according to said prioritized allocation of funds.

10. The system of claim 1 wherein means for establishing a priority for the allocation of funds to said investment asset account(s) and said liability account(s) comprises means for performing a client risk preference analysis.

11. The system of claim 1 wherein means for establishing a priority for the allocation of funds to said investment asset account(s) and said liability account(s) comprises means for determining account constraints including minimum imposed account balances, minimum imposed net cash flow, and minimum imposed borrowing power.

12. The system of claim 1 wherein means for establishing a priority for the allocation of funds to said investment asset account(s) and said liability account(s) comprises:

means for performing a client risk preference analysis;

means for determining account constraints including minimum imposed account balances, minimum imposed net cash flow, and minimum imposed borrowing power; and means for generating a prioritized allocation of funds to said investment asset account(s) and said liability account(s) based on said client risk analysis and said account constraints.

13. The system of claim 1 wherein means for establishing a priority for the allocation of funds to said investment asset account(s) and said liability account(s) is a computer-based programming function.

14. The system of claim 13 wherein said computer-based programming function is dynamic.

15. The system of claim 1 wherein the means for establishing a priority for the allocation of funds to said investment asset account(s) and said liability account(s) is client information.

16. The system of claim 1 wherein the means for establishing a priority for the allocation of funds to said investment asset accounts and said liability accounts is institution information.

17. The system of claim 1 wherein the means for establishing a priority for the allocation of funds to said investment asset accounts and said liability accounts is information of both the client and the institution.

18. The system of claim 1 further comprising means for using said computer system to execute transaction orders on said investment asset account(s) and said liability account(s).

19. The system of claim 18 further comprising means for documenting executed transaction orders of said investment asset account(s) and said liability account(s) in a computer generated account statement.

20. The system of claim 18 further comprising means for ordering transactions to be executed by verbal instructions given by the client either in person or over the telephone.

21. The system of claim 18 further comprising means for ordering transactions to be executed by instructions given by the client through a machine interface such as a personal computer or telephone.

22. The system of claim 18 further comprising means for ordering transactions to be executed through preauthorized scheduled transactions or payments.

* * * * *